United States Patent
Blouin et al.

(10) Patent No.: US 7,403,988 B1
(45) Date of Patent: Jul. 22, 2008

(54) TECHNIQUE FOR AUTONOMOUS NETWORK PROVISIONING

(75) Inventors: Francois J. Blouin, Hull (CA); Dinesh Mohan, Ottawa (CA); Maged E. Beshai, Stittsvillle (CA)

(73) Assignee: Nortel Networks Limited, St. Laurent, Quebec ( * ) Notice: Subject to any disclaimer, the term of this patent is extended or adjusted under 35 U.S.C. 154(b) by 1026 days.

(21) Appl. No.: 10/259,433

(22) Filed: Sep. 30, 2002

Related U.S. Application Data

(63) Continuation-in-part of application No. 10/029,148, filed on Dec. 28, 2001, now Pat. No. 7,249,169.

(51) Int. Cl.
*G06F 15/16* (2006.01)

(52) U.S. Cl. .................. 709/223; 709/220; 709/225; 709/226; 370/235; 370/230; 370/252

(58) Field of Classification Search .............. 709/223, 709/200–201, 202, 227, 225, 226; 370/252, 370/395.1; 455/423; 715/735, 736; 703/1, 703/21, 22, 31
See application file for complete search history.

(56) References Cited

U.S. PATENT DOCUMENTS

| | | | |
|---|---|---|---|
| 6,085,335 A | 7/2000 | Djoko et al. | |
| 6,370,572 B1 * | 4/2002 | Lindskog et al. | 709/223 |
| 6,788,688 B2 * | 9/2004 | Trebes, Jr. | 370/395.1 |
| 6,873,600 B1 * | 3/2005 | Duffield et al. | 370/252 |
| 6,912,203 B1 * | 6/2005 | Jain et al. | 370/252 |
| 6,928,280 B1 * | 8/2005 | Xanthos et al. | 455/423 |
| 6,973,622 B1 * | 12/2005 | Rappaport et al. | 715/735 |
| 7,013,395 B1 * | 3/2006 | Swiler et al. | 713/151 |

* cited by examiner

*Primary Examiner*—Nathan J. Flynn
*Assistant Examiner*—Jude J Jean Gilles
(74) *Attorney, Agent, or Firm*—Hunton & Williams LLP

(57) ABSTRACT

A technique for autonomous network provisioning based on establishing a relation between network performance indices, traffic measurements and resource capacities, which provides automatic provisioning recommendations for identified critical links is disclosed. The technique may be implemented in a network through collaboration across node controllers and network controllers. A method for the autonomous provisioning of a network, wherein a plurality of nodes of the network collaborate to determine required additional resources, may comprise the steps of receiving at least one network-state measurement comprising at least one of a traffic measurement and a performance measurement; determining at least one critical link based at least in part on the at least one network-state measurement; and formulating at least one link provisioning recommendation for the at least one critical link.

33 Claims, 14 Drawing Sheets

| Routes | Rank | Availability | Status |
|--------|------|--------------|-----------|
| AB     | 1    | 1            | Primary   |
| ACB    | 2    | 0            | Secondary |
| ADB    | 2    | 1            | Secondary |
| ACDB   | 3    | 0            | Secondary |
| ADCB   | 3    | 1            | Secondary |

*FIG. 5*

|  | Link B-A | Link B-C | Link B-D |
|---|---|---|---|
| Primary Traffic | 9 | 7 | 3 |
| Secondary Traffic | 1 | 3 | 7 |
| Denied Traffic | 4 | 3 | 3 |

*FIG. 6*

TECHNIQUE FOR AUTONOMOUS NETWORK PROVISIONING

CROSS-REFERENCE TO RELATED APPLICATIONS

This patent application is a continuation in part of U.S. patent application Ser. No. 10/029,148, filed Dec. 28, 2001 now U.S. Pat. No. 7,249,169, which is hereby incorporated by reference herein in its entirety.

FIELD OF THE INVENTION

The present invention relates generally to communication networks, and more particularly, to a technique for providing autonomous network provisioning, resource allocation, routing, network control and network self-governance.

BACKGROUND OF THE INVENTION

Network provisioning processes enable a network to determine the location and size of different network resources available for long-term deployment, typically on an order of several months or years. Such provisioning processes are typically based solely on projected traffic demands within a network and agreed traffic exchanges across other networks.

Traditionally, network provisioning processes have been based on underlying traffic-characterization models, traffic-flow models and performance models. Traditional provisioning processes work well in a telephone network where traffic loads are predictable. In telephone networks, traffic can be characterized with a reasonable accuracy. Further, performance models that relate performance to traffic loads and network resources are both accurate and tractable with respect to telephone networks.

However, conditions applicable to telephone networks do not necessarily apply to fast-evolving data networks. Accurate traffic characterization at microscopic and macroscopic levels is not feasible in rapidly evolving data networks. Microscopic characterization refers to a parametric description of each traffic stream, whereas macroscopic characterization is concerned with spatial distribution of traffic. Microscopic-level characterization is difficult due to rapidly changing nature of traffic and macroscopic-level characterization is difficult due to changing network services.

Elaborate traffic characterization models and ensuing provisioning models are generally applicable over only relatively short timescales. It would take researchers years to develop and refine such models only to discover, before the exercise is complete, that the models are obsolete. One example is the development of the tedious Markov Modulated Poisson Process, which is based on assumptions that have since been deemed to be inadequate. Another extreme is a self-similar-traffic model, which may yield an unduly pessimistic estimation of a network performance. In addition to inadequacies of these models, traffic parameters required to implement mathematical models are difficult to determine. Data traffic is a rapidly moving target and its composition changes with technology. Higher access capacity, new applications, new protocols, new tariff systems, etc., have a significant effect on traffic characteristics at both microscopic and macroscopic levels.

The use of precise microscopic models, even if they are attainable and tractable, cannot be justified, given the rapid change of the traffic nature. Instead, a simplified traffic model may possibly be used as long as the values of the characterizing parameters are updated frequently. A simplified traffic model also leads to a simplified microscopic provisioning model that facilitates computation of traffic-flow across a network. The use of frequently updated simplified models, however, requires traffic monitoring, at least at each source node and frequent execution of provisioning models. The network performance, however defined, must still be measured in order to validate the provisioning model. Furthermore, considering the unavailability of a satisfactory traffic model, it is difficult to determine what to measure and how to extract parameters from measurements. Moreover, current solutions require the use of both traffic models and traffic monitoring, which would require excessive computing time. Thus, relevant current data on which to base provisioning decisions may not be easily obtained.

Currently, computer-aided tools are used for network provisioning. Core nodes provided in such networks may include cross-connectors, optical and/or electronic, which may be configured on a semi-permanent basis. Some proposals (e.g., ITU-T's G.8080/Y.1304 Automatically Switched Transport Network (ASTN)) introduce dynamic configurations, but still require configuration requirements to be determined through manual intervention. Therefore, there is still a need to automatically predict such configuration requirements through learning based on measurements in the network.

In view of the foregoing, it would be desirable to provide a technique for autonomous network provisioning which overcomes the above-described inadequacies and shortcomings. More particularly, it would be desirable to provide a technique for autonomous network provisioning in an efficient and cost effective manner.

SUMMARY OF THE INVENTION

According to the present invention, a technique for autonomous network provisioning is provided. In one particular exemplary embodiment, the technique may be realized by a method for autonomous provisioning of a network comprising a plurality of nodes comprising the steps of receiving at least one network-state measurement comprising at least one of a traffic measurement and a performance measurement; determining at least one critical link based at least in part on the at least one network-state measurement; and formulating at least one link provisioning recommendation for the at least one critical link.

In accordance with other aspects of this particular exemplary embodiment of the present invention, the traffic measurement comprises constituent traffic, wherein the constituent traffic comprises a combination of a primary traffic, a secondary traffic, and a denied traffic; the performance measurement comprises at least one of a routing index and a resource allocation index, the routing index measuring efficacy of a routing function and the resource allocation index measuring efficacy of a resource allocation function; the step of determining further comprises the step of determining whether denied traffic is above a predetermined denied traffic threshold; the step of determining further comprises the steps of marking a traffic request according to a status of a selected route, classifying at least one link according to at least one measurement of the marked traffic request, and identifying at least one primary link having a ratio of primary traffic over secondary traffic above a predetermined threshold; the step of formulating further comprises the step of identifying the at least one critical link for capacity augmentation; the step of formulating further comprises the step of calculating a capacity for the at least one critical link; the step of formulating further comprises the step of implementing a learning method based on at least one historic network-state record; the learning method determines inter-dependence among a combination of network performance, at least one traffic measurement and at least one resource capacity from a plurality of historic network-state records; network performance comprises a quantification of at least one denied traffic request; the at least one traffic measurement comprises constituent traffic, wherein constituent traffic comprises a combination of a primary traffic, a secondary traffic and a denied traffic; the at least one resource capacity comprises at least one link capacity; the learning method uses regression analysis based on at least two blocking vs. occupancy records for a link-type wherein the link-type is based on at least a link capacity and a blocking vs. occupancy record comprising a link performance measurement and a link capacity measurement; the method further comprises the step of determining an objective link occupancy yielding a projected blocking probability equal to or less than a blocking-probability target; the method further comprises the step of distributing a provisioning resource budget to the at least one critical link according to the at least one link provisioning recommendation; the routing function is a source routing function and the step of determining further comprises the step of marking a traffic request according to a status of a selected route from a route set containing at least one route; and the routing function is a hop-by-hop routing function and the step of determining further comprises the step of marking a traffic request according to a status of a selected link from a link set containing at least one link.

In accordance with other aspects of this particular exemplary embodiment of the present invention, a computer signal embodied in a carrier wave readable by a computing system and encoding a computer program of instructions for executing a computer process performing the method recited above.

In another exemplary embodiment, the technique may be realized by a system for autonomously provisioning a network comprising a network controller for receiving at least one network-state measurement comprising at least one of a traffic measurement and a performance measurement; a determining module for determining at least one critical link based at least in part on the at least one network-state measurement; and a provisioning module for formulating at least one link provisioning recommendation for the at least one critical link.

In accordance with other aspects of this particular exemplary embodiment of the present invention, the traffic measurement comprises constituent traffic, wherein the constituent traffic comprises a combination of primary traffic, secondary traffic, and denied traffic; the performance measurement comprises at least one of a routing index and a resource allocation index, the routing index measuring efficacy of a routing function and the resource allocation index measuring efficacy of a resource allocation function; the determining module further determines whether denied traffic is above a predetermined denied traffic threshold; the determining module further marks a traffic request according to a status of a selected route; classifies at least one link according to at least one measurement of the marked traffic request; and identifies at least one primary link having a ratio of primary traffic over secondary traffic above a predetermined threshold; the provisioning module further identifies the at least one critical link for augmentation; the provisioning module further calculates a capacity for the at least one critical link; the method further comprises a budget module for apportioning a provisioning resource budget among the at least one critical link according to the at least one link provisioning recommendation; a learning method based on at least one historic network-state record is implemented in formulating the at least one link provisioning recommendation; the learning method determines inter-dependence among a combination of network performance, at least one traffic measurement and at least one resource capacity from a plurality of historic network-state records; network performance comprises a quantification of at least one denied traffic request; the at least one traffic measurement comprises constituent traffic, wherein constituent traffic comprises a combination of a primary traffic, a secondary traffic and a denied traffic; the at least one resource capacity comprises at least one link capacity; the learning method uses regression analysis based on at least two blocking vs. occupancy records for a link-type wherein the link-type is based on at least a link capacity and a blocking vs. occupancy record comprising a link performance measurement and a link capacity measurement; an objective link occupancy is determined to yield a projected blocking probability equal to or less than a blocking-probability target.

In another exemplary embodiment, the technique may be realized by an article of manufacture for autonomously provisioning a network comprising: at least one processor-readable carrier; and instructions carried on the at least one carrier; wherein the instructions are configured to be readable from the at least one carrier by at least one processor and thereby cause the at least one processor to operate so as to: receive at least one network-state measurement comprising at least one of a traffic measurement and a performance measurement; determine at least one critical link based at least in part on the at least one network-state measurement; and formulate at least one link provisioning recommendation for the at least one critical link.

In accordance with other aspects of this particular exemplary embodiment of the present invention, the article of manufacturing further causes the at least one processor to operate so as to identify the at least one critical link for augmentation; and calculate a desired capacity for the at least one critical link.

In another exemplary embodiment, the technique may be realized by a method for autonomous provisioning of a network comprising the steps of marking at least one traffic request according to a status of a selected route; classifying at least one resource according to measurements of the at least one marked traffic request; sending at least one measurement request to a node which follows a blocking node in a sequence of nodes selected for a traffic request; and formulating at least one provisioning recommendation by learning from at least one historic network-state record.

In accordance with other aspects of this particular exemplary embodiment of the present invention, the network employs at least two protocols and the learning is based on regression analysis related to the at least two protocols.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings.

These drawings should not be construed as limiting the present invention, but are intended to be exemplary only.

FIG. 5 illustrates an example route set in accordance with the present invention.

FIG. 6 illustrates an example of a constituent traffic table in accordance with the present invention.

DETAILED DESCRIPTION OF THE INVENTION

Figure 1:
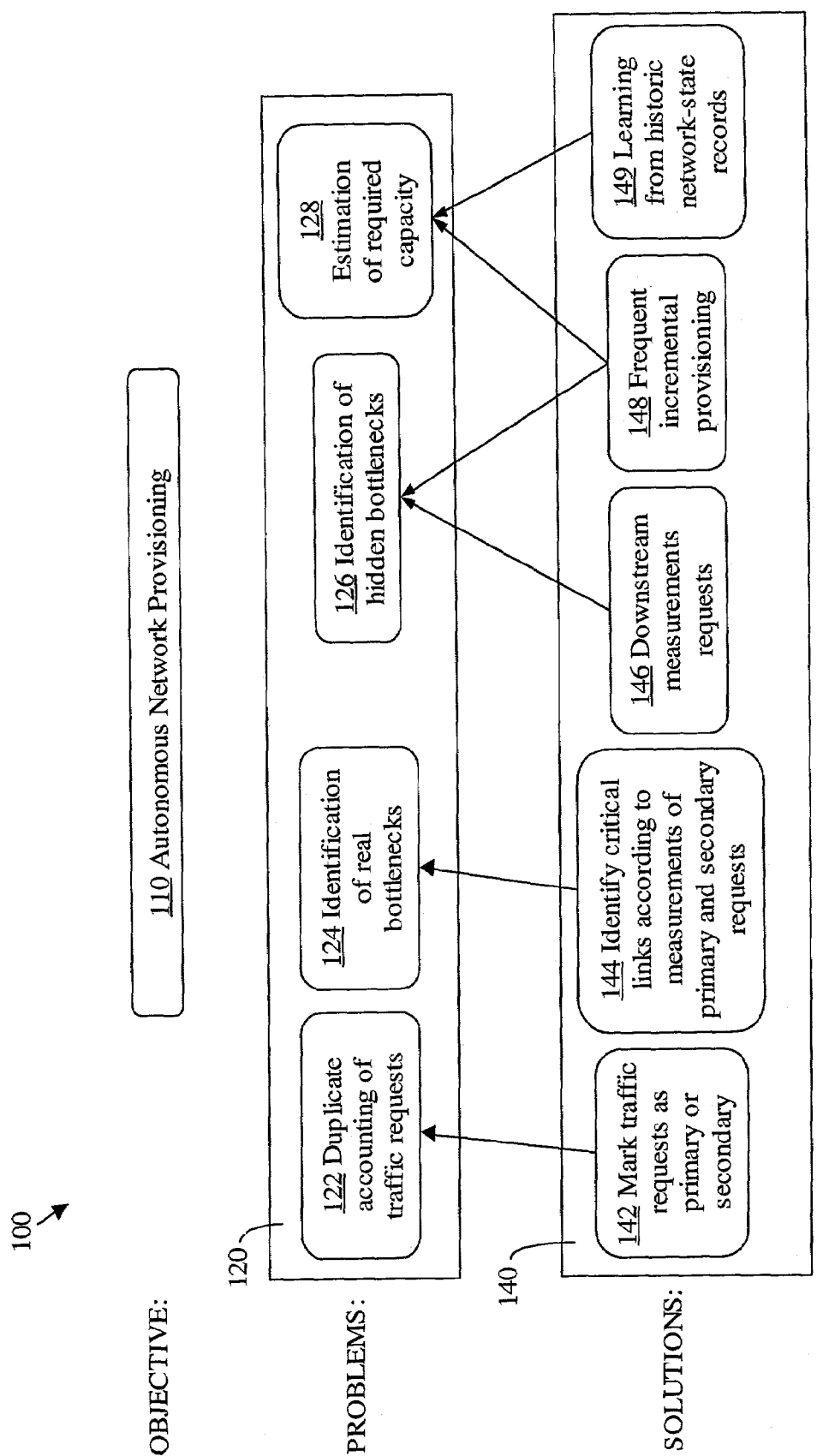
FIG. 1 is an example of a solution map for autonomous network provisioning in accordance with the present invention.

Various problems may be encountered in automated provisioning procedures that rely on measurements in a network that employs alternate routing. FIG. 1 illustrates main problems 120 and a solution map 100 in accordance with an embodiment of the present invention. Examples of problems 120 may include possible duplicate accounting of requests for traffic connections, called herein as traffic requests 122 where two or more routes are considered for the same traffic request; identification of real bottlenecks 124; identification of hidden bottlenecks 126; estimation of required capacity 128 and others. An embodiment of the present invention offers specific solutions 140 to problems 120. A network to be provisioned may include alternate routing capabilities, route-sharing capabilities, and capacity allocation capabilities, thus representing a highly general type of network.

An autonomous network provisioning aspect 110 of the present invention provides a network capable of determining provisioning recommendations autonomously, that is, without human intervention. Conventional network provisioning is labor-intensive. While some steps may be automated (e.g., collection of measurements, calculation of required capacity by some network-planning tool), other steps require human participation (e.g., processing of collected measurements to be used by network planning tools).

As shown in FIG. 1, problem 122 may be identified as duplicate accounting of traffic requests. Network provisioning is often based on estimates or measurements of traffic demand. Traffic demand may include an aggregation of individual traffic requests. In networks with alternate routing, traffic requests may be made to several parallel routes, although only one of these routes may be required to carry the traffic. Measurements of end-to-end traffic, where each measurement includes a requested capacity and identifiers of a source node and a sink node can be distorted by repeated connection attempts when the traffic load substantially exceeds available capacity. Measurements of offered traffic to each link along a candidate route can further be distorted when a traffic request attempts more than one candidate route before selecting a candidate route or rejecting the traffic request. This may lead to a duplicate accounting of traffic requests and, as a result, distort an estimation of the offered traffic load for some links. The present invention offers a solution 142 by which a traffic request is marked as a primary request or a secondary request, for example. Other marks may be used. Thus, a traffic request may be marked as a primary request on only one of the attempted routes.

Another problem 124 may be identified as identification of real bottlenecks. Network provisioning may involve identification of overloaded links that represent bottlenecks for traffic. In networks with alternate routing, a traffic request denied by a first selected route may be allowed on a second selected route, where at least one link of the second route is not part of the first route, thus utilizing capacity on the links of the second route. Links on the second route may therefore be overloaded by traffic destined to the first route. Provisioning may be required on the first route, considered a real bottleneck, but not necessarily on the second route. Problem 124 may involve identifying links for provisioning that represent real bottlenecks. An embodiment of the present invention offers a solution 144 by which links may be classified as primary links and secondary links depending on primary requests and secondary requests measured on the links. Primary links that are overloaded may be referred to as critical links. According to one aspect of the present invention, critical links may be identified as candidates for capacity augmentation. Other classifications may be implemented.

Another problem 126 may involve identification of hidden bottlenecks. A first upstream overloaded link may prevent some traffic requests from reaching a second downstream non-overloaded link. The second link may appear to have sufficient capacity, as it does not carry the traffic for which traffic requests were denied by the first link. Increasing the capacity of the first link may reveal the second link to be a hidden bottleneck, if the second link becomes overloaded link when traffic requests previously denied by the first link are now offered to the second link. An embodiment of the present invention offers at least two solutions that contribute to the identification of hidden bottlenecks. One solution 146 involves sending a measurement request to downstream links of a link rejecting a traffic request, wherein the measurement request is a hypothetical traffic request, asking each downstream link to record whether or not it would have accepted the traffic request. Hypothetical traffic requests may be marked as primary requests. Links may be identified as critical depending on primary hypothetical traffic requests, primary traffic requests and/or secondary traffic requests measured on the links. According to one aspect of the present invention, critical links that are overloaded by a combination of traffic requests and hypothetical traffic requests may be identified as candidates for capacity augmentation. Another solution 148 involves performing frequent provisioning operations, an exercise that may be facilitated by an entirely automated provisioning procedure.

Another problem 128 may involve calculating an estimate of required provisioning capacity to economically meet a chosen grade of service. For example, a provisioning capacity may be considered economical if it is within a specified range of the minimum capacity augmentation required to meet a chosen grade of service. In conventional network provisioning, estimation of a required provisioning capacity is performed by using a macroscopic traffic model for estimating traffic volumes on links of a network and a microscopic traffic model for estimating capacity required on a link to meet a chosen grade of service given a combination of estimated traffic volume and other parameters. While these traffic models may be suitable for voice networks, these traffic models are generally not applicable to fast-evolving data networks where traffic characteristics may change.

Solution 149 involves estimates of required provisioning capacity that may be based on measurements and obtained by learning from historic network-state measurement records, wherein such measurement records maintain network-state collected historically. This solution 149 of the present invention does not make any assumptions about characteristics of traffic and will further adapt when these characteristics change.

Frequent incremental provisioning facilitates estimation of a required provisioning capacity. Capacity of a link may be augmented in fixed increments dictated by characteristics of manufactured equipment and other factors. When provisioning is frequent, a minimum equipment capacity increment may be sufficient for an overloaded link to meet a chosen grade of service. Therefore an estimation of required provisioning capacity may be simplified, through frequent incremental provisioning 148, to a decision of whether or not a link meets a grade of service.

Figure 2:
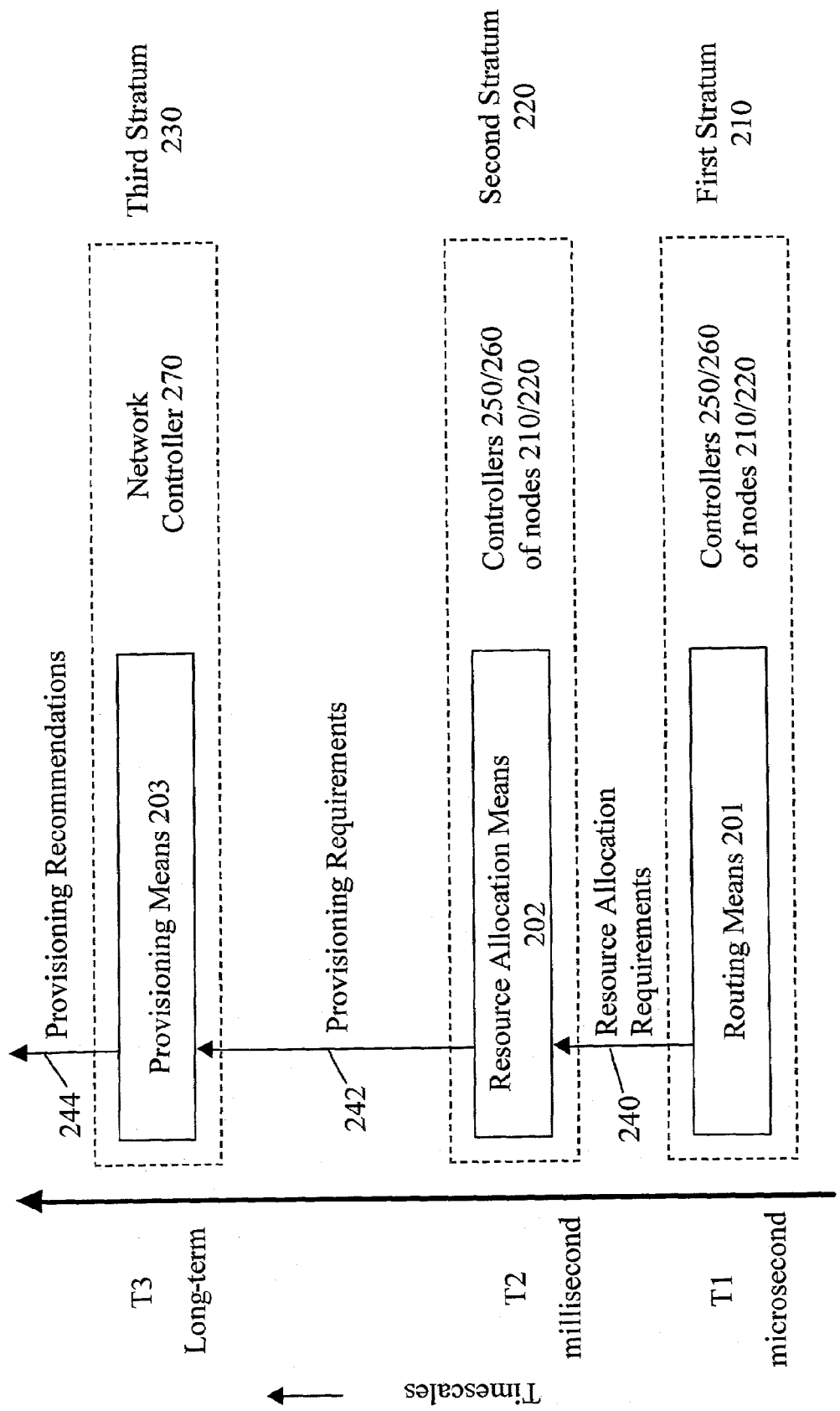
FIG. 2 is a functional representation of a multi-stratum multi-timescale network control in accordance with the present invention.

FIG. 2 is a functional representation of a multi-stratum multi-timescale network control according to an embodiment of the present invention. According to an example of FIG. 2, three strata and three timescales, each timescale being associated with a stratum, may be implemented. Other variations including different timescales and/or different strata may be implemented.

Routing means 201 may operate at a first stratum 210 on a first timescale T1. Although the first timescale T1 is shown as being in the order of microseconds, other timescales or ranges of times may be used. A preference with respect to the timescales, according to an embodiment of the present invention, is that each successive timescale in the network be coarser than a previous timescale. A second timescale is coarser than a first timescale if a mean time interval between consecutive actions associated with the second time scale is appreciably higher than a mean time interval between consecutive actions associated with the first timescale. The actions may include observations, measurements, exchange of messages, execution of processes, computing, etc.

Network state information in the form of resource allocation requirements 240 may be sent as a trigger to resource allocation means 202 operating at a second stratum 220 on a second timescale T2, where T2 may be in an order of milliseconds in this example. A set of network state information in the form of provisioning requirements 242 may be sent as a trigger to provisioning means 203 operating at third stratum 230 on a third timescale T3, where T3 may be a long-term timescale, in this example typically in the order of weeks or months. As mentioned earlier T1, T2 and T3 may use other timescales or ranges of times than those mentioned here for exemplary purposes. A provisioning function may be preferably performed at provisioning means 203 of the third stratum 230. Other information useful to the provisioning function, such as provisioning rules and provisioning budget, may also be provided. The provisioning function may then formulate provisioning recommendations 244, by selecting one or more links that may be augmented and by calculating desired capacity.

In this manner, network functions being performed at various means located at each stratum may collaborate to achieve network self-governance. Functions from a lower stratum may collect network state information, which may be used to calculate requirements that are sent to functions of an upper stratum. A discussion of an exemplary network in association with which the present invention will be described, is followed by detailed specifics of the information collection and calculation involved.

For example, a network with three strata may be described to demonstrate interactions there between. In another embodiment, the first stratum 210 and the second stratum 220 may be integrated. In yet another embodiment, the routing means 201 and the resource allocation means 202 may be integrated. These exemplary embodiments may be provided independently of one another. In yet another embodiment, the second stratum 220 may not be present when a network lacks resource allocation means 202. In this embodiment, requirements from the first stratum 210 may be sent directly to the third stratum 230. Further embodiments involving a network with more than three strata may also be provided following the concepts presented herein, with various adjustments in accordance with the present invention.

Figure 3:
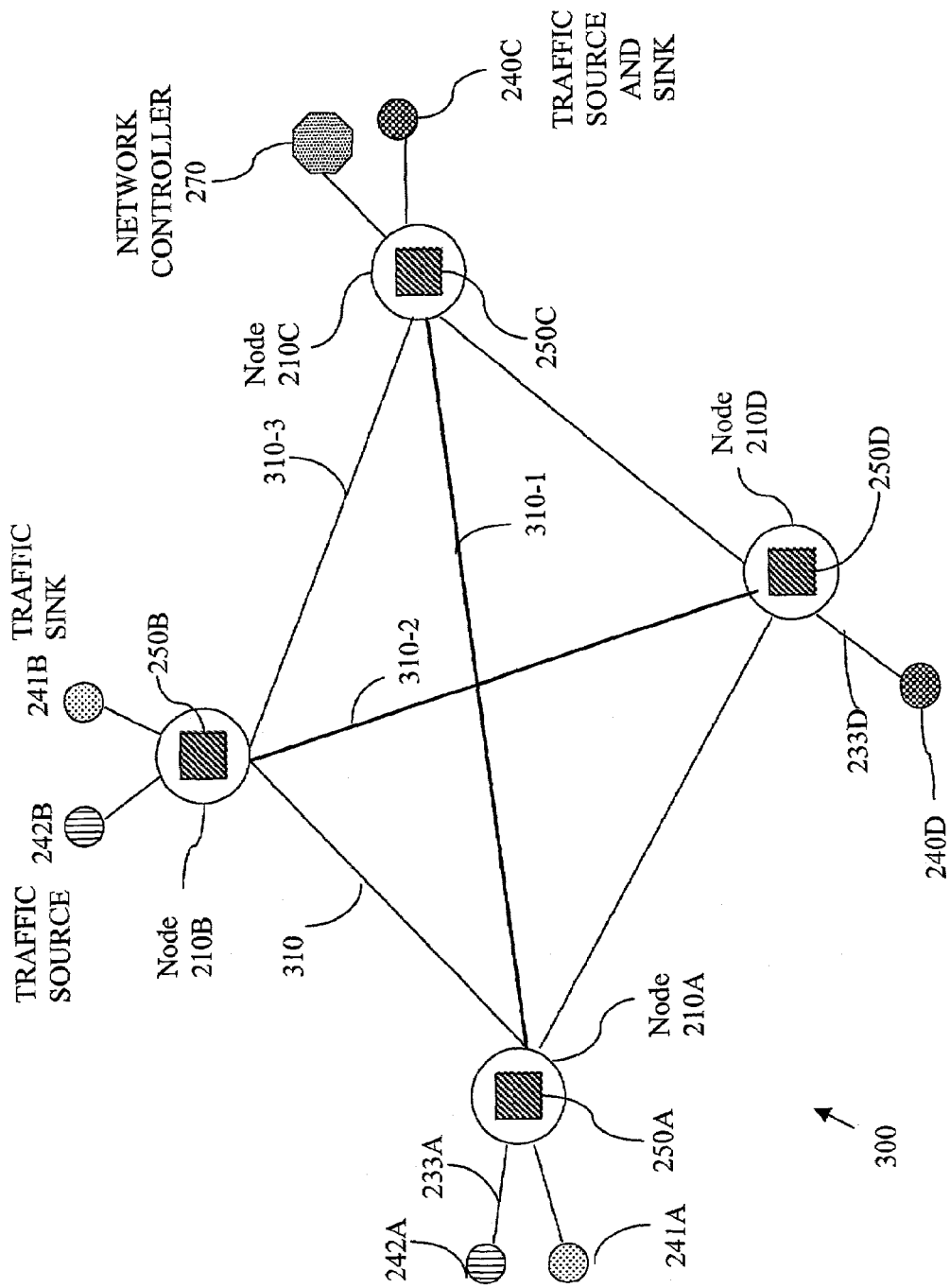
FIG. 3 is a block diagram of a network of directly meshed edge nodes adapted to support autonomous provisioning in accordance with the present invention.

FIG. 3 is an example of a network 300 adapted to support autonomous provisioning in accordance with an embodiment of the present invention. A "node" may refer to an edge node, a core node or any other node or nodes. A "core" may collectively refer to a plurality of core nodes. In addition, an "edge" may collectively refer to a plurality of edge nodes. The network of FIG. 3 includes interconnected nodes 210 (e.g., 210A, 210B, 210C and 210D), which may include an electronic edge node. Nodes 210 may be connected to subtending traffic sources (e.g., 241A) and traffic sinks (e.g., 242A) by access-links (e.g., 233A). A node 210 may also be used to switch traffic that does not originate from subtending sources or terminate in subtending traffic sinks. In another example, a traffic source and a traffic sink may be folded on the same node, as shown by traffic device 240D, 240C. The total traffic demand from a plurality (e.g., some or all) of traffic sources (e.g., 241A) subtending to a specific node, e.g., node 210A, to all traffic sinks (e.g., 242B) subtending to another specific node, e.g., node 210B, constitute an aggregated traffic demand from node 210A to node 210B.

According to an embodiment of the present invention, each node 210 (e.g., 210A, 210B, 210C and 210D) may further includes a node controller 250 (e.g., 250A, 250B, 250C and 250D). The network may also include one or more network controller, as shown by 270. In the example shown in FIG. 3, a network controller 270 is supported by node 210C. Node controllers may exchange control information with other node controllers as well as network controllers. This exchange of control information may occur over in-band paths or out-of-band paths. In-band paths may be embedded within node-node links (e.g., 310-1, 310-2), whereas out-of-band paths may be implemented using other dedicated links. Other network controllers 270 may also be supported by other nodes.

In another embodiment of the present invention, routing means 201 may include at least one node controller 250, 260; resource allocation means 202 may include at least one node controller 250, 260; and provisioning means 203 may include a network controller 270. In another example, resource allocation means 202 may also include at least one node controller 250, 260 as well as a network controller 270.

Routing means 201 may perform route selection functions and route analysis functions. Resource allocation means 202 may perform resource allocation functions and resource allocation analysis functions. Provisioning means 203 may perform network provisioning functions.

Nodes in a network are interconnected by physical links. Each physical link may include one or more fiber links. A number of wavelength channels may be carried by each fiber link, using a Wavelength Division Multiplexing (WDM) technique, for example. A channel-band may include a set of wavelength channels manipulated as a single carrier and contained in a same fiber link. A light-path may include a succession of consecutive channels or consecutive channel-bands forming an optical connection through an optical core from a source node to a sink node across a plurality of intermediate nodes. A light-path has a wavelength continuity property if none of its wavelength channels is converted to another wavelength channel. A wavelength may be modulated at a specific bit rate, which determines the bit rate or the capacity of the associated channel. For example, the bit rate of a channel may be fixed, and may be the same for all channels in the same fiber link. The capacity of a channel may be further divided into time slots of substantially equal duration, using a Time Division Multiplexing (TDM) technique, for example. Each of these different links and portions of capacity thereof described above may be collectively referred to hereinafter as resources.

Figure 4:
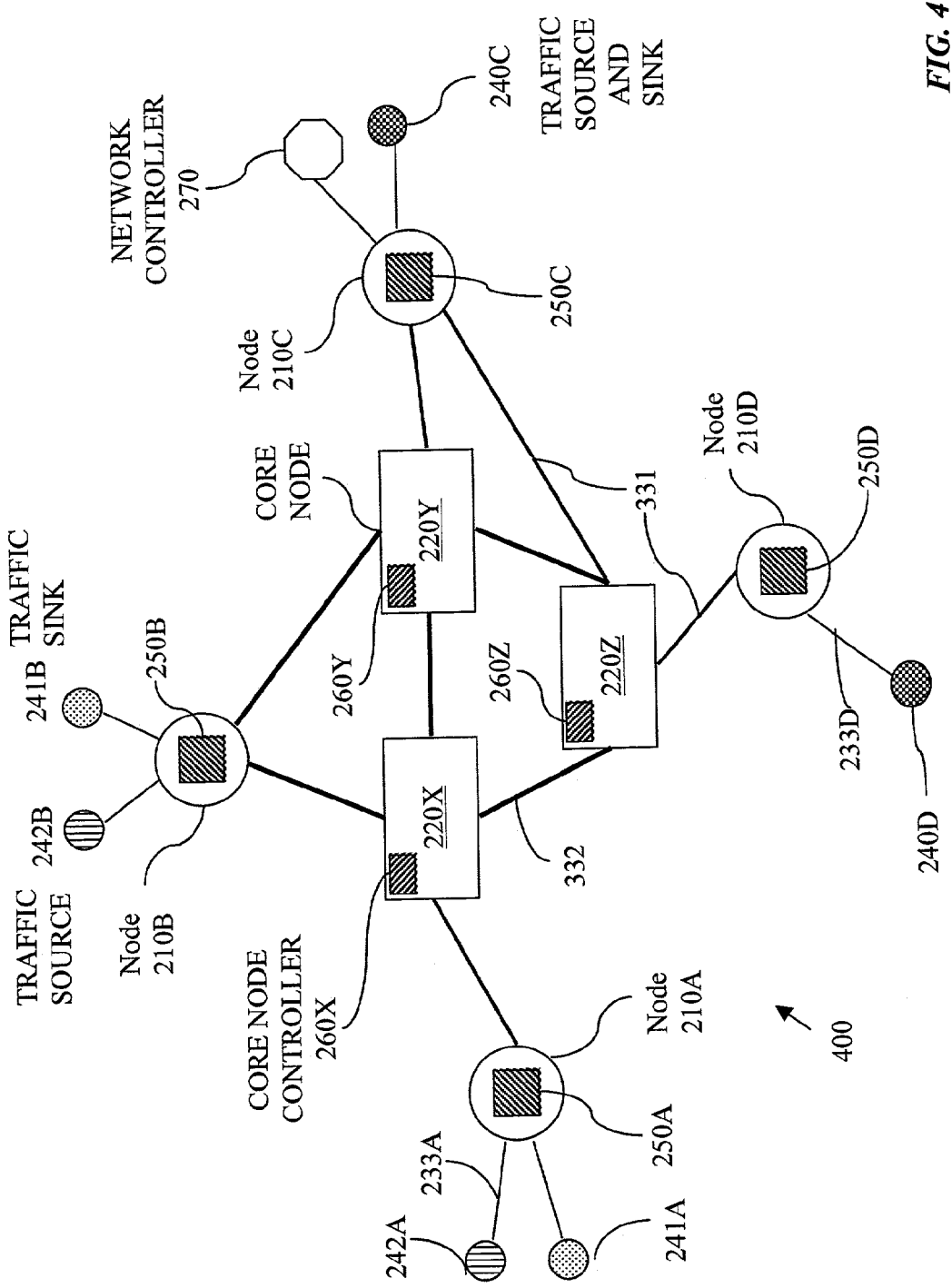
FIG. 4 is a block diagram of a network of edge nodes interconnected by core nodes and adapted to support autonomous provisioning in accordance with the present invention.

FIG. 4 illustrates a network 400 with core nodes in accordance with an embodiment of the present invention. As shown in FIG. 3, nodes (e.g., 210A, 210B, 210C and 210D) may be connected to other nodes through adaptive node-to-node links 310, 310-1, 310-2, 310-3. According to another embodiment of the present invention, core nodes 220 (e.g., 220X, 220Y and 220Z) may provide connectivity between nodes 210 (e.g., 210A, 210B, 210C and 210D) by allocating resources over edge-core links 331 and core-core links 332 to provide node-to-node links of adaptive capacity. The capacity of node-to-node links (e.g., 310 of FIG. 3) may result from an allocation of channels requested by nodes and performed by a resource allocation function in core nodes (e.g., 220X, 220Y and 220Z). For example, a node-to-node link 310-1 between node 210A and node 210C may be provided by resource allocations through core node 220X and core node 220Y.

Specified grade-of-service and quality-of-service objectives can be realized by efficient route selection, adaptive allocation of network resources, and ultimately, by providing sufficient resources. The network may be initially provisioned based on an estimated aggregate traffic demand for each pair of nodes 210. This may determine an initial size and location of the nodes and links in the network. The initial network topology design and capacity provisioning may be based on traditional semi-automated methods. Temporal and spatial changes in traffic and time-varying network state may require adaptive capacity reallocations within the network. This can be realized by providing adaptive core nodes. Adaptive allocations, which may be reallocated automatically, may include wavelength-channels and/or time-slots within wavelength channels. Physical links, however, may be installed manually according to provisioning requirements. A determination of which resources may be reallocated automatically depends on a presence of appropriate control protocols and switching devices in the network.

Resources may also exist for capacity allocation over multiple nodes, within existing adaptive node-to-node links. A path may include a capacity allocated across a source node, a sink node, and possibly intermediate nodes of a specific route A path of specified capacity can be allocated from a source node to a sink node. Several connections can be established within a path without the need to signal across the network. The capacity of a path can be adapted to follow aggregate-traffic variations. A connection may be set up within an existing path, in which case it may not require signaling to intermediate nodes to allocate resources. A connection that is set up outside a path may use signaling to intermediate nodes to allocate resources and may be referred to as an independent connection.

From the above discussions of different resources, it is apparent that there may be several levels of resources in a network. A physical link may carry several adaptive node-to-node links, each of which may carry several paths, where each path may carry several connections. Therefore, there may be multiple levels of resource allocation. The number of optical channels, optical channel-bands, and TDM slots composing an adaptive node-to-node link may be modified to adjust capacity between two nodes. The capacity of a path or capacity of a connection may also be modified. For simplicity, a resource allocation function may be described in reference to allocation of optical channels to adjust the capacity of adaptive node-to-node links. The present invention may be further extended to multi-level resource allocation, as well as allocation of channel-bands, TDM time slots, path capacity and connection capacity.

Connections, paths, and light-paths may collectively be referred to as data transporters. Data transporters may be routed through a network. That is, a node receiving a data transporter may select a node and a link to which the transporter is forwarded towards transporter's destination. The sequence of links followed by the data transporter from a source node to a sink node forms a route. The route may be specified by the source node, or it may be decided hop-by-hop by one or more intermediate nodes. To illustrate various embodiments of the present invention, an example involving source routing, where each source node stores information related to a set of candidate routes to each sink node, will be described in detail below. Application of the methods of the invention to an alternative route-selection method, known as hop-by-hop routing, will then be briefly described. Other applications and methods may be implemented.

When routing data transporters, a routing function may trigger a signaling function. The signaling function may reserve resources on nodes and links along a selected route for a data transporter. The signaling function may also be triggered when modification of capacity of an existing data transporter is desired. Capacity modifications may include a capacity increment or decrement.

A set-up of a connection within a path may be simplified by resources that have already been allocated on intermediate nodes. Signaling may be required to a sink node of a connection. Routing of a connection-oriented packet may be simplified by presence of a label in a packet header indicating a connection to which that packet belongs. A connection-oriented packet may follow a route specified for the connection to which it belongs.

For simplicity, a routing function and a signaling function of an embodiment of the present invention will be described in reference to independent connections, that is, connections that are set up outside a path. For further brevity, an independent connection will be referred to hereinafter as a connection. It is noted that an independent connection may be viewed as a path that is dedicated to one connection.

According to an embodiment of the present invention, node controller 250 (e.g., (250A, 250B, 250C and 250D) of node 210 (e.g., 210A, 210B, 210C and 210D) in a network may maintain pre-calculated route sets, where each route set may be associated with a particular sink node. Route sets may be pre-calculated at a time of network initialization (or other time) and following each new network provisioning.

Each route set may include a plurality of routes from a source node to a sink node. Each route of the plurality of routes may be an ordered list of node-to-node links over which connections may be established and may further differ from other routes in the route set by at least one route metric. The route metrics may include cost, distance, diversity, reliability, intermediate node hops and protection, for example. For simplicity, a route may be noted by an ordered list of nodes traversed by the route. With reference to a network representation as shown in FIG. 3, a route from source node 210A, to intermediate node 210C, and to sink node 210B may be referred to as route ACB.

FIG. 5 illustrates an example route set for a sink node 210B from a node 210A of a network in accordance with an embodiment of the present invention. Route set 500 may include a list of records, each record 502 specifying a sequence of nodes 510 defining the route, an assigned rank 520, an availability state 530, and a route status 540. The routes within a route set may be ordered according to a rank that may be assigned relative to other routes in the route set. A rank assignment may be based on a pre-determined criterion. In another exemplary embodiment, the pre-determined rank assignment criterion, noted as Q, may be a linear combination of a route propagation delay and the number of intermediate hops along the route, $Q=\alpha\Delta+H$, where $\Delta$ represents a propagation delay, H represents a number of hops and $\alpha$ represents a tunable parameter. Each of the ranks illustrated in FIG. 5 may be based on the number of hops (e.g., $\alpha=0$).

A route with the least value of rank assignment criterion Q may be considered most desirable and assigned a topmost rank. Therefore, top-ranked routes may appear at a beginning of an ordered route set while low-ranked routes appear deeper in a route set. Routes with a value of Q with a same range may be given the same rank while routes with the same rank may be described as belonging to a route-band of that rank within a route set.

The depth of the route selected from a route set for any connection may be used as a measure of success in selecting an optimal route from that route set. Therefore, a route of a better rank, being higher up in the route set, has a lower depth in the route-set. When this route is selected by the route selection function, the lower depth as the selected route indicates a success in selecting a better route [please clarify]. When a route in a route set becomes unavailable as a result of a temporary condition, such as a link failure (or other condition), the route may be marked as unavailable and will not be selected by a route selection function until the cause of unavailability is corrected. The route set itself is not modified. Node controllers will adhere to the calculated route set until it is recomputed as a result of provisioning. A method of availability-state dissemination across a network is described in U.S. patent application Ser. No. 09/630,190, filed Aug. 1, 2000 and titled "Courteous Routing", which is incorporated herein by reference in its entirety.

As shown in FIG. 5, a route status 540 may be used to classify connections established between nodes to measure constituent traffic. The status 540 of a route may be primary or secondary. Other status identifiers maybe applied. In an exemplary embodiment of the present invention, a top-ranked route in a route set may be assigned primary status, while other routes are assigned secondary status. The present invention may be further extended to allow a plurality of routes to be assigned primary status, provided that the extended method avoids duplicate accounting for denied traffic requests on a plurality of routes. A method allowing a number of routes to be given primary status may also be extended to allow the status of a route to be changed dynamically during operation of a network. For example, the status of a secondary route may be upgraded to primary, if denied traffic on primary routes reaches a given threshold, indicating that the volume of traffic necessitates an extra primary route.

Figure 6:
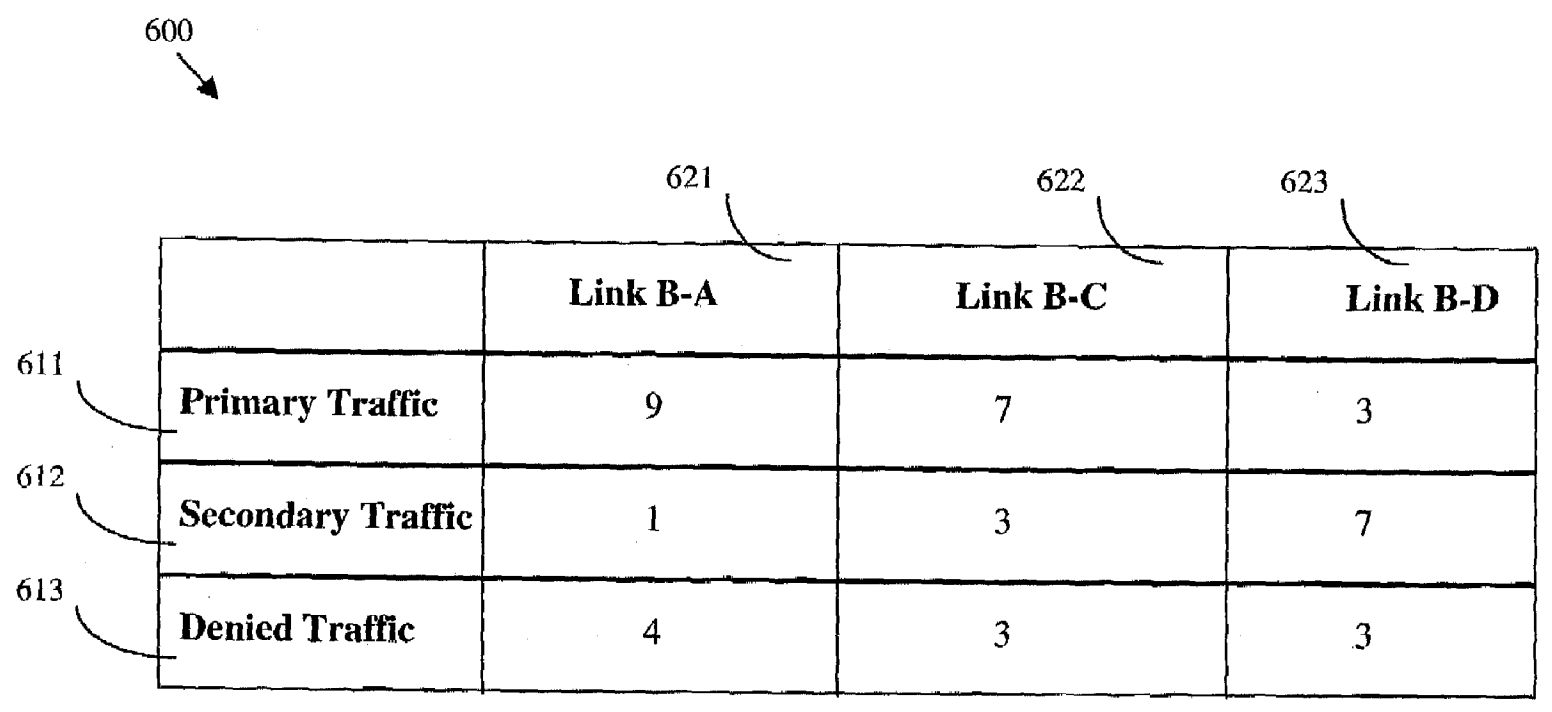

FIG. 6 illustrates an example of a constituent traffic table 600 that may be maintained by a node controller 250 or 260 for node-to-node links for classifying and quantifying constituent traffic, in accordance with an embodiment of the present invention. To differentiate traffic requests sent across a primary route from traffic requests sent across a secondary route, traffic requests are marked according to the route status of the selected route. Traffic requests across a primary route may be marked as primary requests or otherwise identified. Traffic requests across a secondary route may be marked as secondary requests or otherwise identified. When a connection is setup, or constituent traffic is measured for a node-to-node link, a node controller may update values for constituent primary traffic 611 or constituent secondary traffic 612 by adding a connection capacity in a column corresponding to a node-to-node link over which the connection is requested. Constituent primary traffic may refer to primary requests over primary routes, whereas constituent secondary traffic may refer to secondary requests carried over secondary routes.

Constituent primary traffic 611 for a link may be updated when a primary request is made for that link, while constituent secondary traffic 612 for a link may be updated when a secondary request is made for that link. However, when a primary request cannot be accommodated, denied traffic 613 may be updated. When a connection is removed, constituent primary traffic 611 or constituent secondary traffic 612, depending upon how the connection was setup, may be decreased by a connection capacity value in a column corresponding to the node-to-node link. Node-to-node links may be labeled into categories indicating a requirement that resources of a link be increased, maintained, or decreased, based on constituent traffic and/or network rules. For example, according to a particular rule, if constituent traffic is 85% constituent primary traffic while remaining 15% is constituent secondary traffic, a node-to-node link may be placed in a category for a resource increase if denied traffic is more than 30% of total carried traffic.

FIG. 6 illustrates a constituent-traffic table 600 in accordance with an embodiment of the present invention. The table illustrates the constituent traffic for three links in a network 300. As indicated in column 621, link B-A carries nine units of primary traffic (field 611) and one unit of secondary traffic (field 612), with four denied units of traffic (field 613). Likewise, columns 622 and 623 indicate the constituent traffic values for links B-C and B-D respectively.

Figure 7:
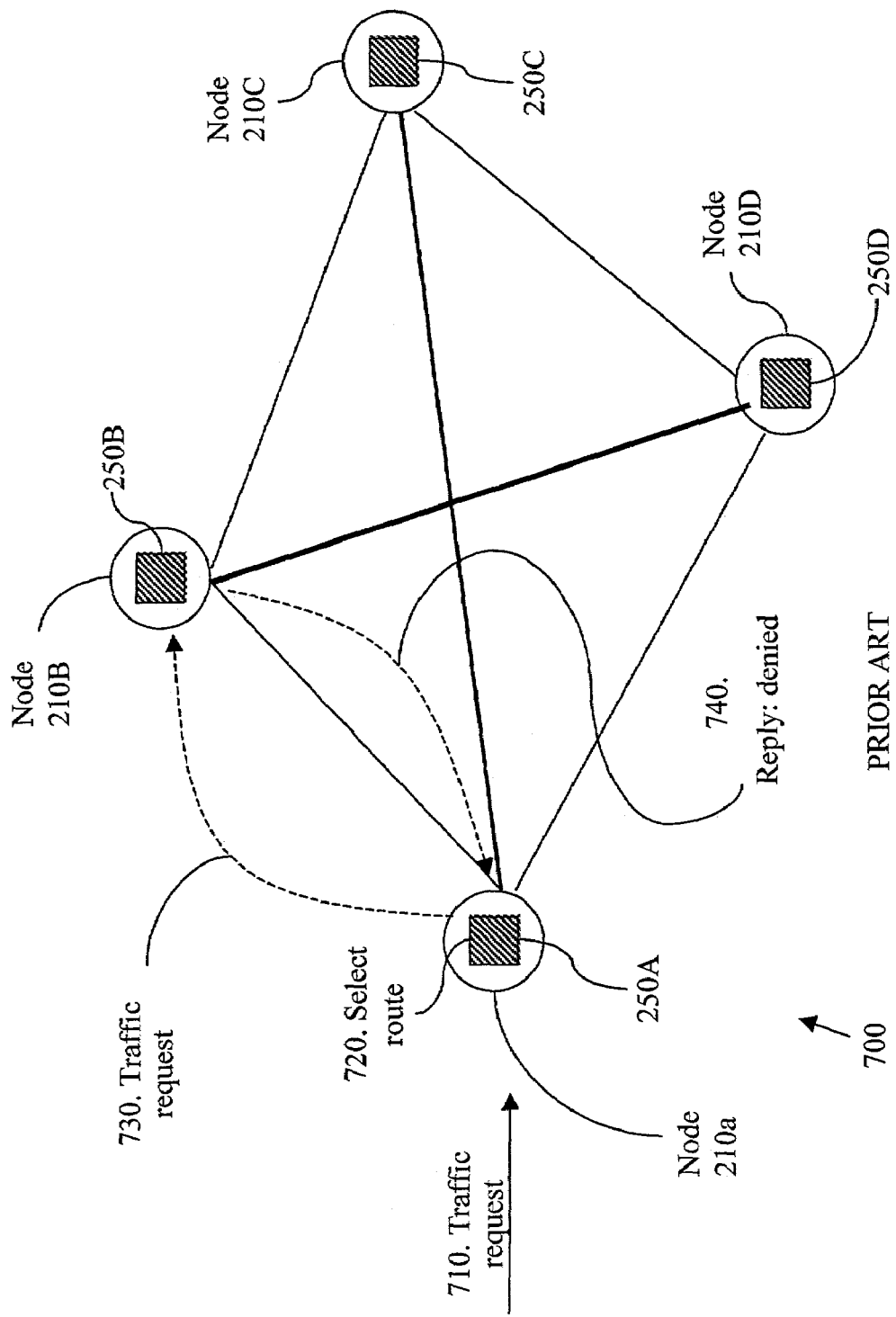
FIG. 7 illustrates a conventional signaling method for a network.

FIG. 7 illustrates a conventional signaling method for a network 700. As shown by step 710, a traffic request 710 for a connection from node 210A to node 210C arrives at node 210A. The traffic request may have, for example, a connection capacity requirement of 2 Gbps (Giga bits per second). As shown by 720, a route selection function may choose a route, such as route ABC, from a route set predefined for node-pair (A, C). As shown by 730, node 210A sends a traffic request 730 to node 210B. In this example, link A-B has sufficient capacity to handle the traffic request 710. However, link B-C has only 1 Gbps of unused capacity left. Therefore, intermediate node 210B determines that link B-C does not have sufficient capacity and denies the traffic request 730. As shown by 740, node 210B sends a reply to node 210A indicating that the traffic request 730 is denied. At this point, node 210A receives the reply 740 and selects another route, on which steps of signaling method may be repeated. The procedure may continue until a traffic request is accepted or a route set is exhausted.

Figure 8:
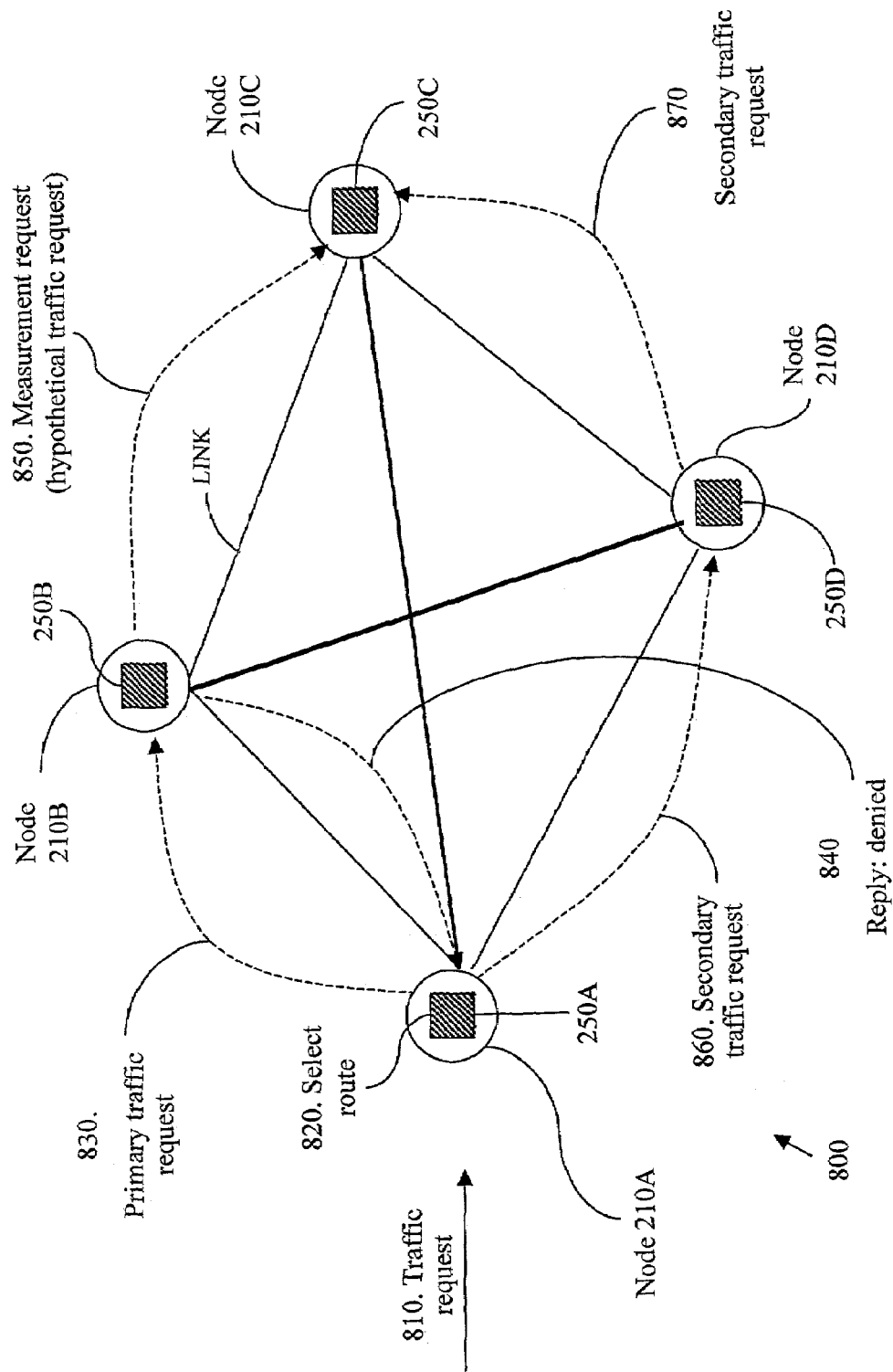
FIG. 8 illustrates a connection signaling method for tracking of constituent traffic in accordance with the present invention.

FIG. 8 illustrates an example of a connection signaling method for tracking constituent traffic in a network 800 in accordance with an embodiment of the present invention. The connection signaling method for tracking constituent traffic may forward a traffic request end-to-end even when an intermediate node denies the traffic request.

As shown in FIG. 8, a traffic request for a connection from node 210A to node 210C arrives at node 210A as shown by 810. A route selection function may choose a route, such as route ABC, from an appropriate route set as shown by 820. Assuming that route ABC is a primary route, a primary traffic request sent from node 210A to node 210B as shown by 830 indicates that measurements are to be taken along the entire end-to-end route ABC. When a node is able to accommodate the connection capacity across the node-to-node link specified in the traffic request, the node adds the connection capacity to constituent primary traffic in the constituent traffic table 600 for that link. When the node is not able to accommodate the connection capacity, it adds the connection capacity to denied traffic in the constituent traffic table. For example, node 210B determines that link B-C does not have sufficient capacity and denies the primary traffic request. Node 210B adds the connection capacity to the denied traffic in the constituent traffic table for link B-C. As shown by 840, node 210B sends a reply to node 210A indicating that the primary traffic request is denied. After node 210B denies the primary request, node 210B forwards a measurement request to node 210C, the next node in the route, as shown by 850. The measurement request may be viewed as a hypothetical traffic request, asking node 210C to record whether it would have denied the traffic request, had it not been denied by previous node 210B. When a node would not have been able to accommodate connection capacity across the node-to-node link specified in the measurement request, the node adds the connection capacity to denied traffic in the constituent traffic table. In another embodiment of the present invention, when a node would have been able to accommodate connection capacity across the node-to-node link specified in the measurement request, the node adds the connection capacity to constituent primary traffic in the constituent traffic table. The forwarded measurement requests as shown by 850 may be repeated until a traffic request reaches a sink node, as represented by node 210C.

When traffic request 810 reaches a node controller 250B of node 210B (e.g., a sink node), the node controller 250B may send a reply, as shown by 840, to a node controller 250A of a previous node (e.g., node 210A). The reply may be sent backwards along a selected route towards a source node. Reply 840 may be followed until the reply reaches a source node. A node controller, upon receiving the reply, may commit reservations made against the traffic request 810 when the reply indicates success. However when the reply indicates that the connection is denied, as shown by reply 840 in FIG. 8, the node controller may release any reservations made against the traffic request. If the reply corresponds to a primary traffic request and the reply indicates that the connection is denied, the connection capacity may now be subtracted from the constituent primary traffic column for the node-to-node link where the connection capacity was added upon receiving the traffic request 810.

Upon receiving a denied-connection reply, a source node controller may select a next available route in the route set and repeat signaling over the route. Route selection procedure may be repeated until the connection is accepted over one or more routes or until all routes in a route set have been exhausted. In FIG. 8, source node 210A selects secondary route ADC after receiving a denied-connection reply for a primary request over a primary route ABC. Node 210A sends a secondary request to intermediate node 210D, as shown in 860. When a node is able to accommodate the connection capacity across the node-to-node link specified in the secondary request, the node adds the connection capacity to constituent secondary traffic in the constituent traffic table for the specified link. When the node is not able to accommodate the connection capacity, the node sends a denied-connection reply to a previous node. The reply may be sent backwards along a selected route until the reply reaches a source node, as represented by node 210A. In another exemplary embodiment, when a node denies a secondary request and sends a denied-connection reply, the node may add the connection capacity to the denied traffic in the constituent traffic table for the link specified in the denied traffic request. In FIG. 8, node 210D accepts the secondary request, adds the connection capacity to the constituent secondary traffic for link D-C, and forwards the secondary request to node 210C, the next node in the route, as shown by 870.

Figure 9:
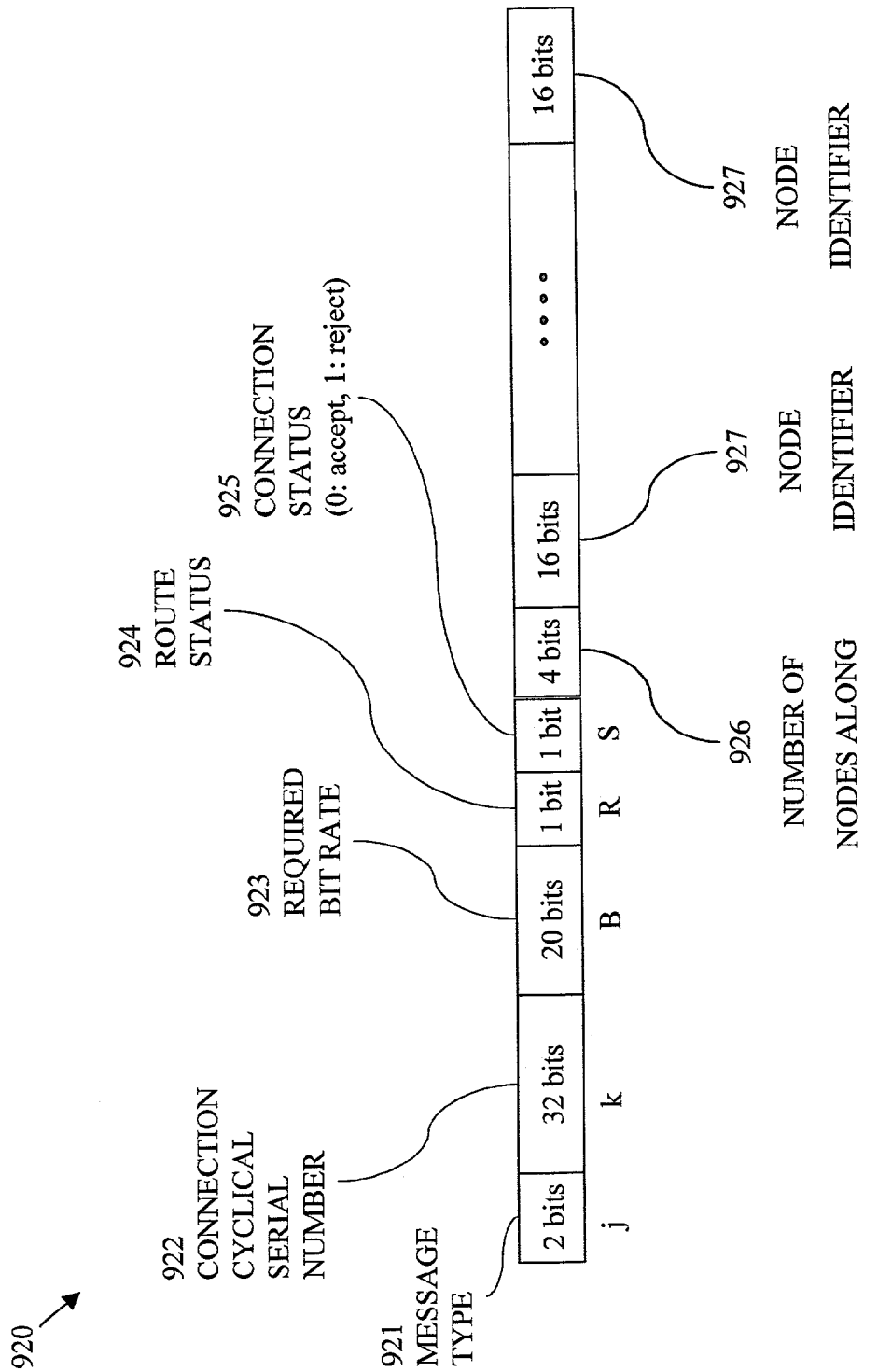
FIG. 9 illustrates a message used for connection tracking or release in accordance with the present invention.

A traffic request may specify a source node, a sink node, and possibly a required capacity allocation (e.g., bit rate allocation) as well as other parameters. FIG. 9 illustrates a traffic request in accordance with an embodiment of the present invention. Message 920 may function as a connection-tracking message to facilitate connection admission, route selection, and/or traffic request status tracking. Message 920 may have various fields. In this example, five fields 921, 922, 923, 924 and 925 may describe a traffic request, followed by a description of a route under consideration.

Field 921 may include a message type identifier. For example, when field 921 is set to equal '00', message 920 may be interpreted as a connection-tracking message. When field 921 is set equal to '01', message 920 may be interpreted as a connection-acceptance message. When field 921 is set equal to '10', message 920 may be interpreted as a connection-rejection message. Other identifiers may be implemented. Field 922 may contain a cyclic connection serial number. If a field width is 16 bits, for example, then 65536 connections may be in progress simultaneously. For example, for a field width of 32 bits, as indicated in FIG. 9, then 4,294,967,296 connections can be in progress. Field 923 may contain a representation of a required (or desired) bit rate allocation for a connection. If a width of field 923 is 20 bits, for example, bit rate may be expressed with a granularity of about $10^{-6}$ ($2^{-20}$), where a capacity unit is $10^{-6}$ of a channel capacity. For example, if the channel capacity is 10 Gbps, then the capacity unit is 10 Kbps (Kilo bits per second). Field 924 may indicate a status of a route. According to an embodiment of the present invention, a route status may assume one of two values (e.g., 0 and 1). A route-status of '0' may signify that a route used is a preferred path, also known as a primary route. A route status of '1' may indicate that a connection is established over any of the other routes in a route set corresponding to a source node and a sink node of a connection. A route of status '1' may be referred to as a secondary route. Field 925 may indicate a status of a traffic request, where '0' may denote that previous links along a route have accepted a traffic request, and '1' may indicate that at least one link along a route has denied a traffic request. Field 926 may indicate a number of nodes along a route under consideration. Identifiers of the nodes along the route may be entered at field 927. A number of entries at field 927 may represent a number of nodes in the route under consideration.

Message 920 may also be used as a release message to reset a link-capacity reservation along a route made during an unsuccessful connection-admission. When field 921 is set to equal '11', message 920 may be interpreted as a resource-release message. Fields 924 and 925 are not needed when message 920 is used to release resources of a connection. However, these fields may be kept for uniformity. A route described in field 926 and the following entries may be a part of a tentative route under consideration.

According to another embodiment of the present invention, a method for autonomous identification of primary links in a network is provided. The method may be based on automatic measurements of network-state, including constituent traffic measurements. The method may include the steps of (1) assigning a status to a route in a route-set, the status being primary or secondary, for example; (2) marking a traffic request on a selected primary route as a primary request, and marking a traffic request on a selected secondary route as a secondary request; (3) measuring constituent traffic for each link over a specified period of time, the constituent traffic comprising primary traffic and secondary traffic, where primary traffic is a measure of primary requests accepted on the link, and secondary traffic is a measure of secondary requests accepted on the link; (4) identifying as primary links the links for which the ratio of primary traffic over secondary traffic is above a certain threshold; and (5) reporting to another network control function or to a network operator a list of primary links and their ratio of primary traffic over secondary traffic.

Route status may be assigned at the time of calculating the route-sets, for example by a network controller 270. The marking of traffic requests as primary requests or secondary requests and the measurement of constituent traffic may be performed by the routing means of a node controller, a function of the first stratum. The identification of primary links and the reporting may be performed by the routing means or other functions of a node controller. For example, the node controller may produce a list of primary links and their associated ratio of primary traffic and secondary traffic, and report the list to the resource allocation function in the second stratum. The resource allocation function may utilize the list of primary links to prioritize the allocation of available bandwidth. The list of primary links may also be used by the provisioning function, in combination with measurements of denied traffic, to formulate capacity augmentation recommendations for the overloaded primary links.

Performance of a route selection function may be measured based on collective efficacy of route selection for connections signaled during a period of measurement. The period of measurement may preferably coincide with a next timescale associated with resource allocation across node-to-node links of routes. The resource allocation, as explained below, may occur in a millisecond timescale. The efficacy of route selection may be measured with a routing index for a route set and may be carried out on a similar timescale at which the route selection function runs, e.g., microsecond timescale.

A routing index is a metric associated with a route set that measures the result of a route selection function. According to an embodiment of the present invention, network information sent from a first stratum 210 to a second stratum 220 for determining resource allocation requirements may include a routing index. The routing index may be based on any appropriate characteristic (e.g., route depth, constituent traffic, and/or traffic classification with respect to defined thresholds).

According to an embodiment of the present invention, a routing index may be based on a depth of one or more routes within a route set at which connections are set up successfully. With reference to FIG. 5, if a connection is setup over route ACB, a depth of this route may be 2. If a traffic request is denied on all routes in a route set, a route depth for the denied traffic request may be assigned a pre-determined value, which may be a maximum depth of a route set plus one.

In an intermediate timescale T2 (e.g., a millisecond timescale), measurements made by node controllers may be analyzed and requirements for resource allocations may be identified. A timescale for carrying out resource allocation may be in milliseconds. Source node controllers may calculate a routing index for route sets in a millisecond timescale. For example, a routing index $\chi$ may be an average depth of routes weighted by a capacity of traffic requests, which may be calculated as:

$$\chi = \frac{\sum_{j=0}^{N} D_j \times C_j}{\sum_{j=0}^{N} C_j}$$

where $D_j$ represents a route depth assigned to a traffic request of connection capacity $C_j$ and N represents a total number of traffic requests received against a route set during a period of measurement. The connection capacity $C_j$ may be defined in terms of bandwidth, data rate, bit rate, byte rate, and/or other suitable measurement.

In another embodiment of the present invention, node controllers may be configured with a predetermined threshold value of a route set metric, such as a threshold for depth of route sets, for example. When an overall routing index for a route set exceeds a threshold, a source node controller may mark a top route in a route set for an increase in resource allocations. For example, top routes in a route set with an overall routing index exceeding a threshold may be slated for increase in resource allocations. Other variations may be implemented.

Node controllers may perform various measurements. For example, source node controllers may measure a routing index during route selection. In addition, node controllers, including a source node controller, may collect state information (e.g., constituent traffic, etc.) for marked traffic requests. The measurements provide a measure of efficacy associated with routing means 201. Further, the measurements may also provide for determination of resource allocation requirements for primary links.

State collection for a marked traffic request allows node-to-node links to be classified under different possible states. According to an aspect of the present invention, state collection for a marked traffic request may be modified such that a link is labeled critical if its state does not allow it to accommodate more traffic requests while currently carrying a majority of primary traffic. This aspect of the present invention also eliminates duplicate collection of state since a node-to-node link would not be labeled critical if it rejects marked traffic requests while carrying mostly secondary traffic. In addition, classified constituent traffic may be further quantified.

Within a millisecond timescale, measurements made across node controllers 250 may be analyzed and requirements for resource allocations may be sent to resource allocation means 202, shown in FIG. 2. Based on a predetermined routing index threshold, route sets for which measured routing index cross the predetermined routing index threshold may be marked as candidates for resource allocations. For routes slated for increase in resources from these route sets during a measurement period, requirements for resource allocations may be sent for critical links that form part of these routes. Other intermediate nodes may also send resource allocation requirements for critical links. According to another embodiment of the present invention, node controllers may also offer to reduce use of existing resources over node-to-node links having low occupancy by marking the offered resources as unavailable for routing function. According to an embodiment of the present invention, requirement for resource allocations may also include indications for overall routing index calculated against a route set that may serve as a severity indication for resource allocation. Another indication to be included may be a measure of traffic requests that could not be accommodated during the measurement period. This indication allows a processing entity (or other entity) to determine an amount of the allocations. Another indication that may be included in these resource allocation requirements may include constituent traffic measurements across primary links (or other links).

A resource allocation function operating at resource allocation means 202 as shown in FIG. 2 may provide a second degree of control for self-governance. Resource allocation is a function in a second stratum and may be implemented by node controllers 250. Based on measurements taken by routing functions implemented on routing means 201, requirements for resource allocations may be passed as triggers from first stratum 210 to second stratum 220. First stratum 210 may also send resource release messages for other node-to-node links. Requirements for resource allocation and resource release messages may further enable node controllers 250 to configure network resources. Configuring may refer to a process of capacity reallocation so that end-to-end capacity requirements are satisfied. Capacity may be quantified in data-rate units such as bits per second, octets per seconds, or any other suitable unit.

Node controllers 250 may process received requirements for resource allocation in order of severity, for example. A routing index may be an indication of the severity. Correction may be accomplished by adding released resources identified by resource release message to a pool of free resources and allocating the released resources to different node-to-node links based on requirements for resource allocation. The resources may be channels, time-slots, etc. Resource allocation function may occur in a second timescale, e.g., millisecond timescale, to adapt to changes in traffic and/or network state as indicated by requirements for resource allocation.

According to another example, a network, or parts of a network, may not be adapted to provide adaptive resource allocations. For example, a static-core network is a network in which core nodes do not dynamically allocate channels to node-to-node links. In networks, or parts of networks, where there is no support for resource allocation, functions of an intermediate stratum may be integrated with a provisioning function of an upper stratum. In this case, a resource allocation function may include converting resource allocation requirements into resource provisioning recommendations without including adaptive resource re-allocations.

According to another embodiment of the present invention, resource allocation function efficacy may be measured and reported to functions in a next timescale network function, running on provisioning means 203. For each resource allocation operation, efficacy may be measured in terms of success in allocating resources as per the resource allocation requirement. For a static-core network, as described above, adaptive resource re-allocation may not be performed and is therefore not measured.

Node controllers may calculate a Resource Allocation Index for a resource based on the number of requirements against that resource and failure of resource allocation function in satisfying such requirements. Resource Allocation Index may represent a measure of efficacy of resource allocation for a resource. Repeated failure in adaptive resource allocation for a resource may indicate a repeated need for the resource and repeated failure in allocation. Since the requirements for resource allocations may be calculated by a routing function, the routing function may send requirements for critical links belonging to primary routes. A high frequency of failures to re-allocate resources may indicate a need to provision resources for critical links. Therefore, Resource Allocation Index may be determined for critical links by counting incidents of failures in resource allocation during a period of measurement. According to an embodiment of the present invention, a period of measurement for Resource Allocation function may coincide with a next timescale corresponding to a provisioning function. Frequency of failures in successfully allocating resources may indicate a degree of severity in such primary links.

Node controllers may perform measurements where source node controllers may measure a resource allocation index during resource-allocation processes. In addition, node controllers as well as source node controllers may collect state information (e.g., constituent traffic, etc.) for marked traffic requests. The measurements may allow for learning associated with effectiveness of a network to handle connections. A provisioning function may be performed at provisioning means 203 of a third stratum 230, as illustrated in FIG. 2. Lower strata of a self-governing network may collect performance measurements and identify provisioning requirements, which may specify critical links as candidates for provisioning, referred herein as candidate links. Lower strata may provide a list of provisioning requirements to the provisioning function. Other information required (or desired) by the provisioning function, such as provisioning rules and a provisioning budget, may also be provided. The provisioning function may formulate link-provisioning recommendations, by selecting candidate links that may be provisioned and calculating a desired capacity. A measure of frequency of failure to re-allocate resources as indicated by resource allocation index may indicate the overload severity of critical links across which the resource allocation requests are received. Thus, critical links may be determined based on constituent traffic measurements, for example.

According to an embodiment of the present invention, a network provisioning method for various data networks is provided. Instead of relying on characterizations based on traffic models, the network provisioning method of the present invention may be based primarily (or solely) on constituent traffic measurements. In addition, triggers sent from lower strata to higher strata may be based on constituent traffic measurements. As a result, drawbacks associated with forecasting of traffic spatial distribution and other forms of traffic models are significantly reduced.

A provisioning function of the present invention may be used to identify node-to-node links that may be provisioned and to calculate capacity that may be added. According to an embodiment of the present invention, a measurement of constituent traffic may be sent as a provisioning requirement indicator for critical links. For example, a node controller 250 may send constituent traffic of each critical physical link to network controller 270. Upon reception of a list of critical links and associated constituent traffic information from core nodes, network controller 270 may compute a list of critical links, sorted in decreasing (or other preferred) order of denied traffic quantity, for example.

According to an embodiment of the present invention, for a network with core nodes, at each provisioning interval, a node-to-node link constituent traffic information may be translated into edge-to-core link constituent traffic and core-to-core link constituent traffic.

Edge-to-core link constituent traffic may be calculated at a node controller. A edge-to-core link may be traversed by a plurality of node-to-node links. Each node-to-node link may be mapped to a corresponding edge-to-core link. Primary traffic, secondary traffic and denied traffic of node-to-node links may be added to obtain constituent traffic of an associated edge-to-core link. As a result, a node controller may obtain a table of constituent traffic of entire outgoing edge-to-core links. Edge-to-core links, where a denied traffic is non-zero and where primary traffic is above a certain threshold, may be considered critical. These links may be candidates for provisioning. The candidate links may be reported by node controllers to a provisioning function on network controller 270.

Core-to-core link constituent traffic may be calculated at a core controller 260 with information provided by a node controller. The node controller may map node-to-node links to a first core node of each node-to-node link. The node controller may then send constituent traffic of each node-to-node link to a corresponding core controller. The core controller may map node-to-node links to core-to-core links and core-to-node links. The core controller may then add up primary traffic, secondary traffic and denied traffic of node-to-node links within a core-to-core link or a core-to-node link. As a result, a core controller may obtain a table of constituent traffic of physical links emanating from an associated core node. Links where denied traffic is non-zero and where primary traffic is above a certain threshold, may be considered critical and may be further considered candidate links for provisioning. The candidate links may then be reported by core controllers to a provisioning function on a network controller.

A network provisioning method of the present invention may be performed at a network controller 270. The network provisioning method may include receiving a list of critical links in a network and distributing a provisioning budget of resources among a plurality of critical links. The list of critical links in the network may be received from a node controller 250, a core controller 260 and/or any combination of other devices.

At each provisioning interval, a provisioning function may have an associated resource budget determined by a network operator (or other entity). Upon receipt of a list of candidate links from node controllers and/or core controllers, a network controller may distribute a resource budget among candidate links according to established rules. Such rules may distribute resources in proportion to an amount of denied traffic on each link, according to one example. For example, if a resource budget allows eight units of capacity, and denied traffic is four capacity units on link A-X, two capacity unit on link X-Y, and four capacity units on link Z-D, the allocation may be determined as 3.2 capacity units on link A-X, 1.6 unit on link X-Y and 3.2 units on link Z-D. In this example, cost associated with a capacity unit may be a fixed value, independent of corresponding link or links. Budget apportioning among candidate critical links may be preferably based on cost where the cost per capacity unit is a function of link length.

A network provisioning method may operate on resources that require human intervention for allocation. A nature of these resources may vary depending on the network. An example of such a resource may include a fiber link, which may require installation of transmission equipment, and/or installation of interface cards at nodes. A provisioning function may determine recommendations for provisioning of links and/or nodes that already exist in the network. The provisioning function may explicitly recommend capacity for links. Implicitly, the provisioning function may also recommend capacity for the nodes, where capacity of a node may be defined as the number of link ports comprised by the node.

Constituent traffic measurements may be weighed by time. Mapping of node-to-node link to core-to-core link may change over time. One way to alleviate the change may involve reporting constituent traffic to core controllers frequently within a provisioning interval (e.g., at every resource re-allocation interval or other interval).

In another embodiment of the present invention, a learning method is provided for formulating provisioning recommendations. The provisioning recommendations may involve determining interdependence among network performance, traffic measurements and/or resource capacities from historic network-state records. Traffic measurements and resource capacities may be combined into a measure of resource occupancy, as illustrated in FIGS. 10-14.

Figure 10:
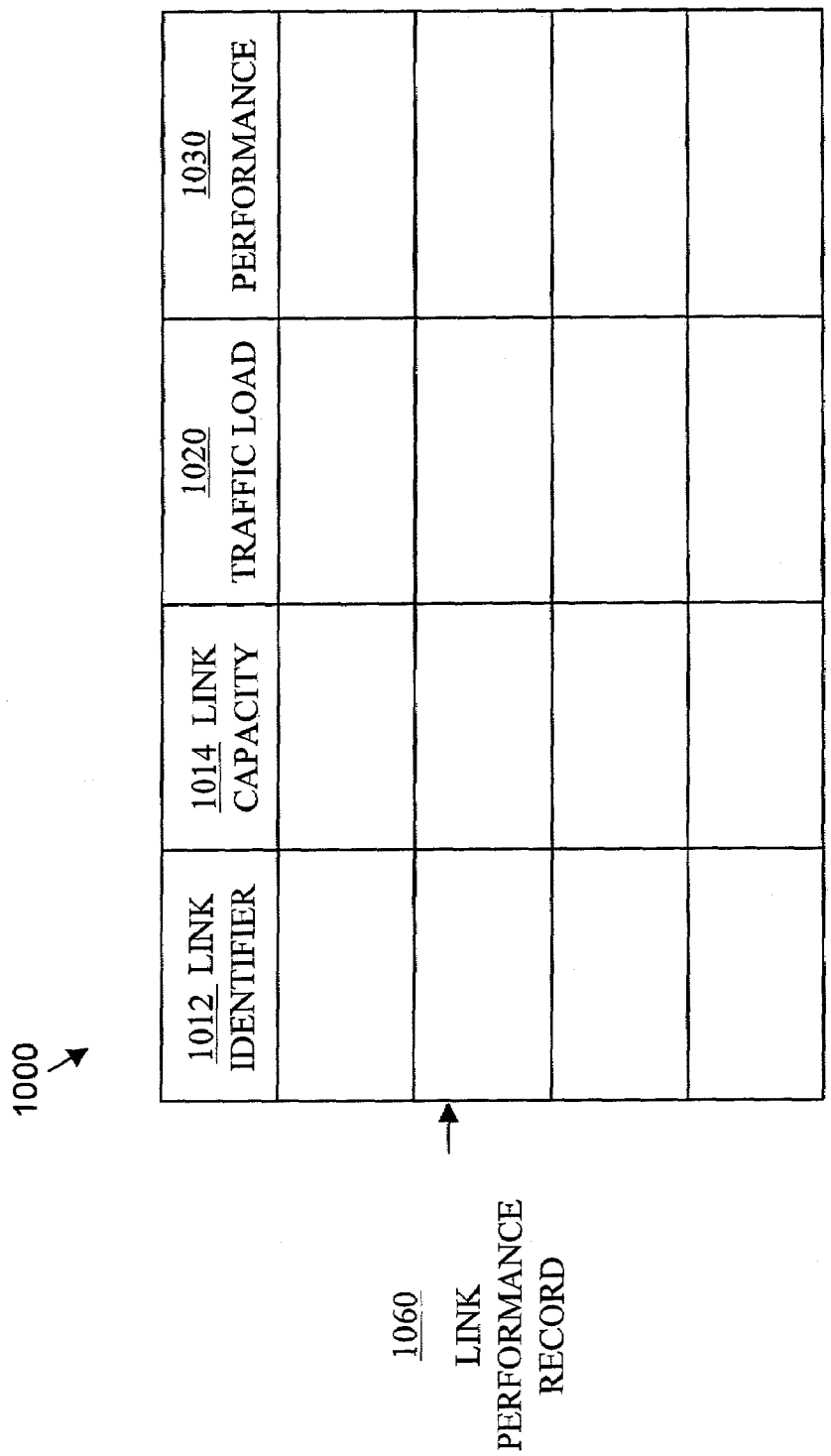
FIG. 10 is an example of a link performance table in accordance with the present invention.

FIG. 10 is an example of a link performance table 1000 in accordance with an embodiment of the present invention. FIG. 10 shows a link performance table 1000 used to store historic network-state records. A link performance table 1000 may include link performance records 1060 containing measurements collected by a network. Each link performance record 1060 may contain a link identifier 1012, a link capacity 1014, a measure of link traffic load 1020 and a measure of link performance 1030.

Measurements in a link performance table 1000 may be collected over a time period. The time period may be one hour, for example. Other time periods may be implemented. Link identifier 1012 may represent a value that uniquely identifies a link for which measurements contained in a link performance record are collected. Link capacity 1014 may represent a maximum bit-rate sustained by an associated link, at a time at which associated measurements are collected.

Traffic load 1020 may represent a measurement of traffic at an associated link over a measurement period. The measurement period may be the same (or substantially similar) for all records in a link performance table. According to an embodiment of the present invention, traffic load may represent an average bit-rate of carried traffic during a measurement period. The average bit-rate of carried traffic during a measurement period may be derived from a measurement of constituent traffic, collected at a time period, or measured separately. In addition, traffic load 1020 may be a vector including several measured traffic parameters. For example, traffic load 1020 may represent a vector including an average traffic load in a first traffic parameter and/or a variance of traffic load in a second traffic parameter.

Performance 1030 may represent a measurement of performance at an associated link over a specified time period. According to an embodiment of the present invention, measurement of performance may include a proportion of traffic requests that are blocked. This proportion may be used to determine an estimator of blocking probability. The blocking probability is often referenced simply as "blocking". Blocking may be calculated as a ratio of a bit-rate of denied traffic requests over a bit-rate of offered traffic requests.

Figure 11:
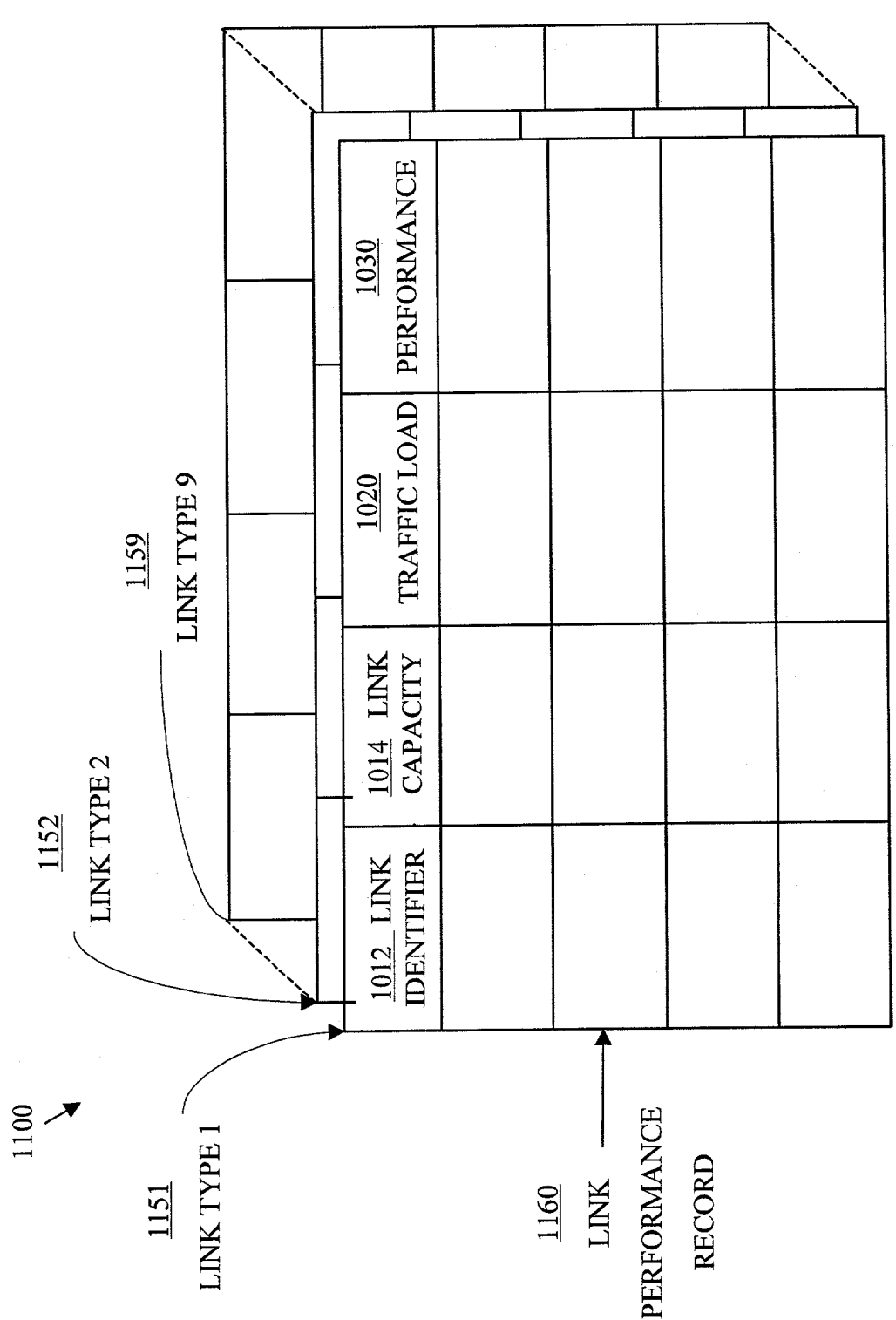
FIG. 11 is an example of a plurality of link performance tables associated with link-types in accordance with the present invention.

Links in a network may be classified according to link-type, where the link-type may be based on at least a link capacity. Links of the same (or similar) link-type may have the same (or similar) capacity. Link performance records may be placed in different tables 1000 according to link-type, as shown in FIG. 11. Link performance records for links having a same (or similar) link-type in a network may be placed in the same link performance table, as shown by 1100. FIG. 11 shows link performance tables 1151, 1152, 1159, referred to herein collectively or individually as 1150. In FIG. 11, link performance table 1151 is associated with link-type 1, link performance table 1152 is associated with link-type 2, and so on. A specified measurement duration may be the same (or substantially similar) for records of link performance tables.

A learning model may be defined as a predictor function that calculates a projection of traffic load on a link given a value of link performance. The predictor function may be based on measured traffic load parameters and link performance measurements contained in a plurality of historic link performance records 1150. A learning model may be associated with each link-type. A learning model may be, for example, a linear regression model, a non-linear regression model, other statistical model or a link performance simulator. A learning model associated with a link-type may calculate a projection of link performance and a projection of traffic load based on selected link performance records from a corresponding link performance table (e.g., 1150).

Link-types that have not been installed in a network or for which there is insufficient historic performance data may require a different link-performance prediction model that may not necessarily be based on historic performance data. For these link-types, projection formulas or other types of models may be provided by network operators (or other entities). These models may be used by an automated provisioning method in place of a learning model to formulate a provisioning recommendation.

In another embodiment of the present invention, a learning model may be a piecewise-linear regression model. In this embodiment, traffic load (e.g., 1020, 1020) may be a measured carried traffic load and performance (e.g., 1030, 1030) may be a proportion of blocked traffic referred to as blocking. Link performance records within a link performance table may be sorted in increasing order of traffic load (or other preferred order). To estimate blocking for a given traffic load, link performance records may be scanned until a traffic load record value greater or equal to a given traffic load is determined. Linear interpolation of traffic load in a previous record may be used to calculate a projected blocking value. Data conditioning, interpolation and other techniques may be used to increase accuracy of estimates.

Figure 12:
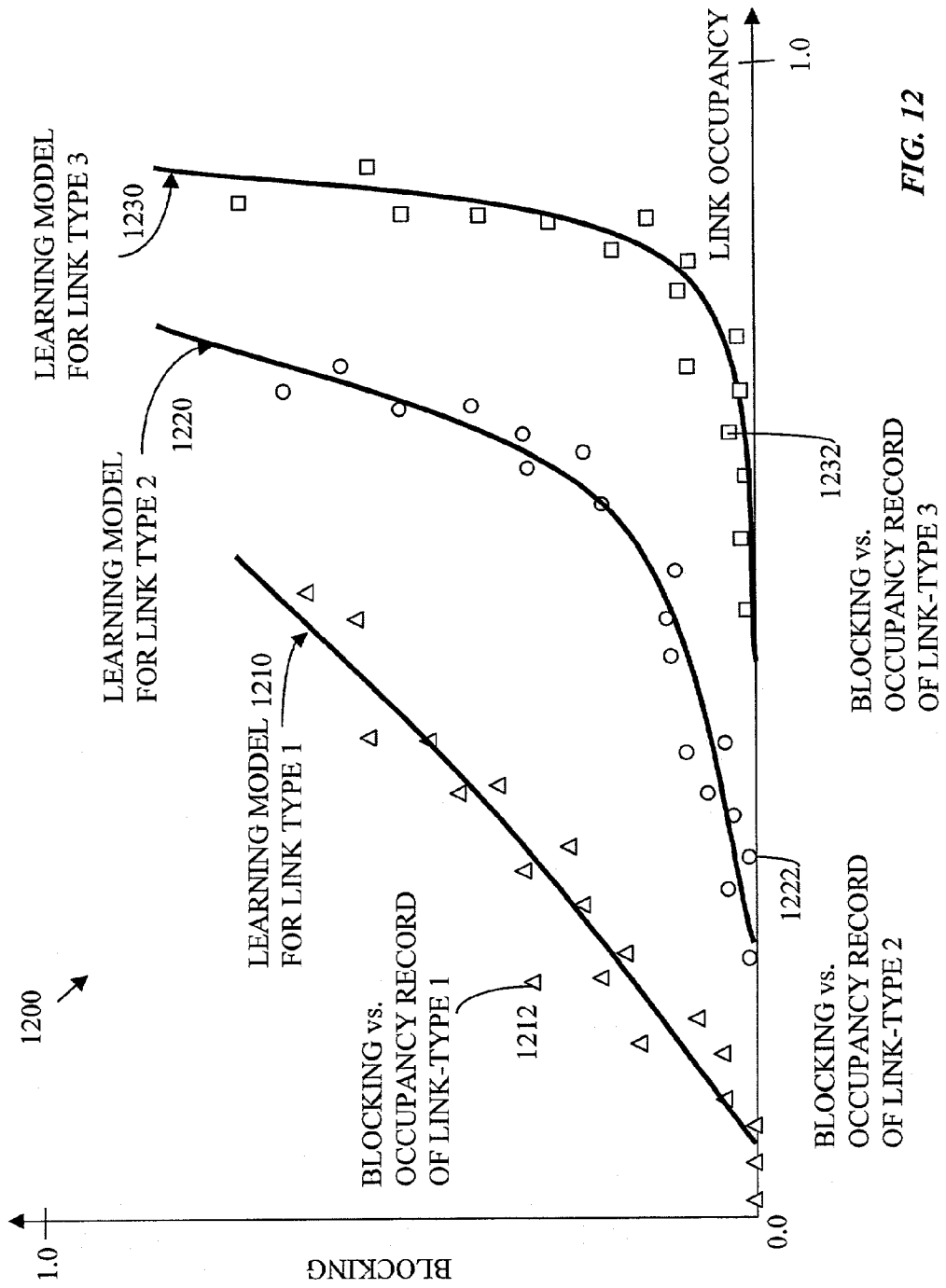
FIG. 12 illustrates blocking in relation to link occupancy for formulating provisioning recommendations in accordance with the present invention.

FIG. 12 illustrates link occupancy in relation to blocking for formulating provisioning recommendations in accordance with an embodiment of the present invention. In FIG. 12, blocking may be a measurement of link performance (e.g., 1030), as shown by graph 1200. Link occupancy may be derived from link capacity (e.g., 1014) and measurements of traffic load (e.g., 1020). Associated blocking and link occupancy values may be grouped to form blocking vs. occupancy records as shown in FIG. 12. Records for three link-types, link-type 1, link-type 2 and link-type 3 are graphically illustrated in FIG. 12. In this example, link-type 3 may have a capacity greater than link-type 2, and link-type 2 may have a capacity greater than link-type 1. Plotted records that belong to a particular link-type are marked with a common symbol. For example, 1212 represents a blocking vs. occupancy record of link-type 1; 1222 represents a blocking vs. occupancy record of link-type 2; and 1232 represents a blocking vs. occupancy record of link-type 3. A curve (e.g., a non-linear regression curve) represents a learning model produced from blocking vs. occupancy records for each link-type. In this example, curve 1210 represents a learning model for link-type 1; curve 1220 represents a learning model for link-type 2 and curve 1230 represents a learning model for link-type 3.

Figure 13:
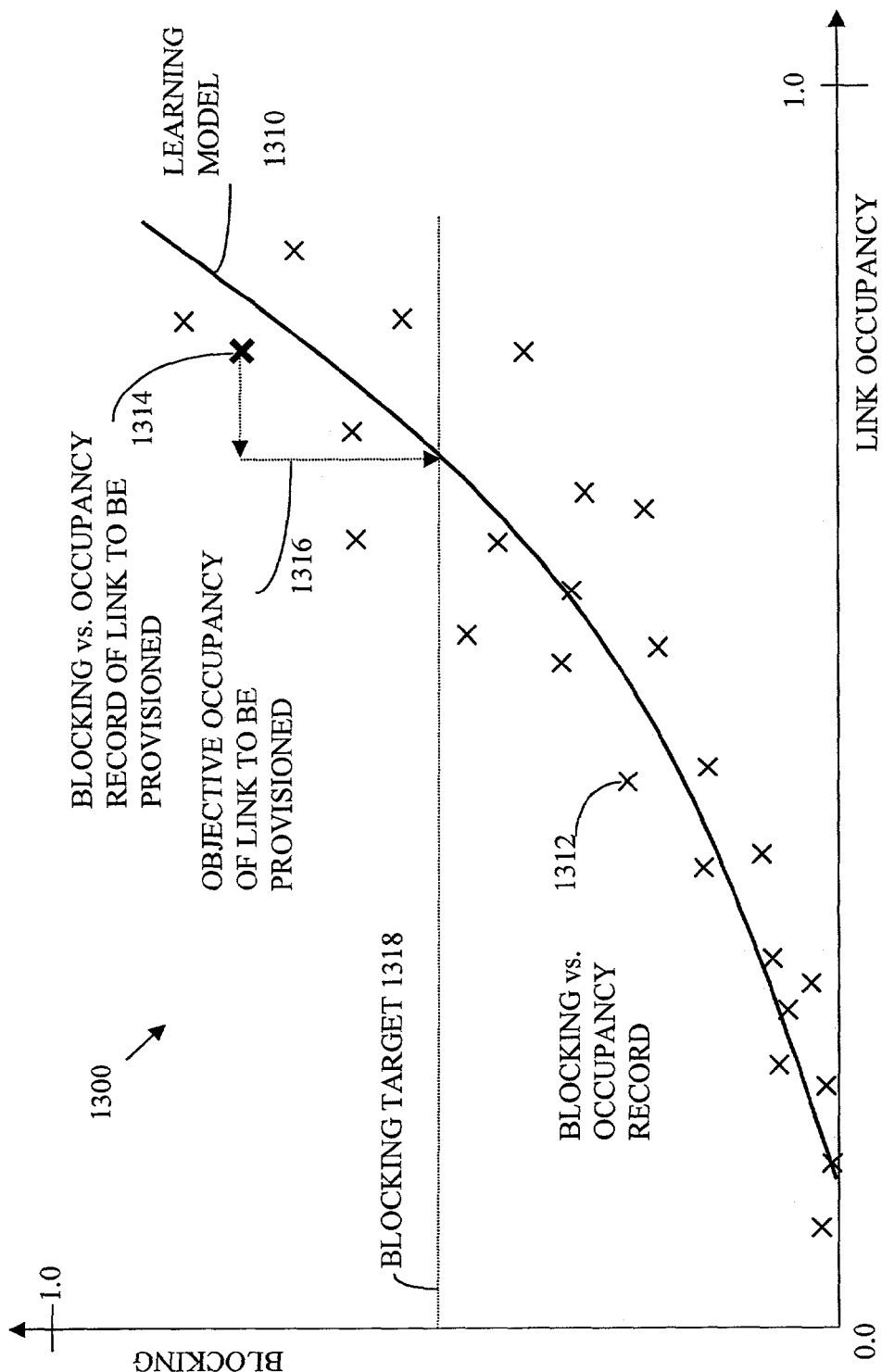
FIG. 13 illustrates a detailed view of a learning model in accordance with the present invention.

FIG. 13 illustrates a detailed view 1300 of a learning model for a link-type in accordance with an embodiment of the present invention. As shown in FIG. 13, blocking vs. occupancy records (e.g., 1312) associated with a link-type may be used to produce a learning model as shown by 1310. For example, record 1314 may belong to a critical link identified to receive a provisioning augmentation. A previously determined target blocking value may be provided as an input, as illustrated by 1318. Learning model 1310 may calculate an objective link-occupancy 1316 that yields a projected blocking equal or inferior to a blocking target 1318. The objective link-occupancy may be used to formulate a desired capacity for the overloaded critical link.

Figure 14:
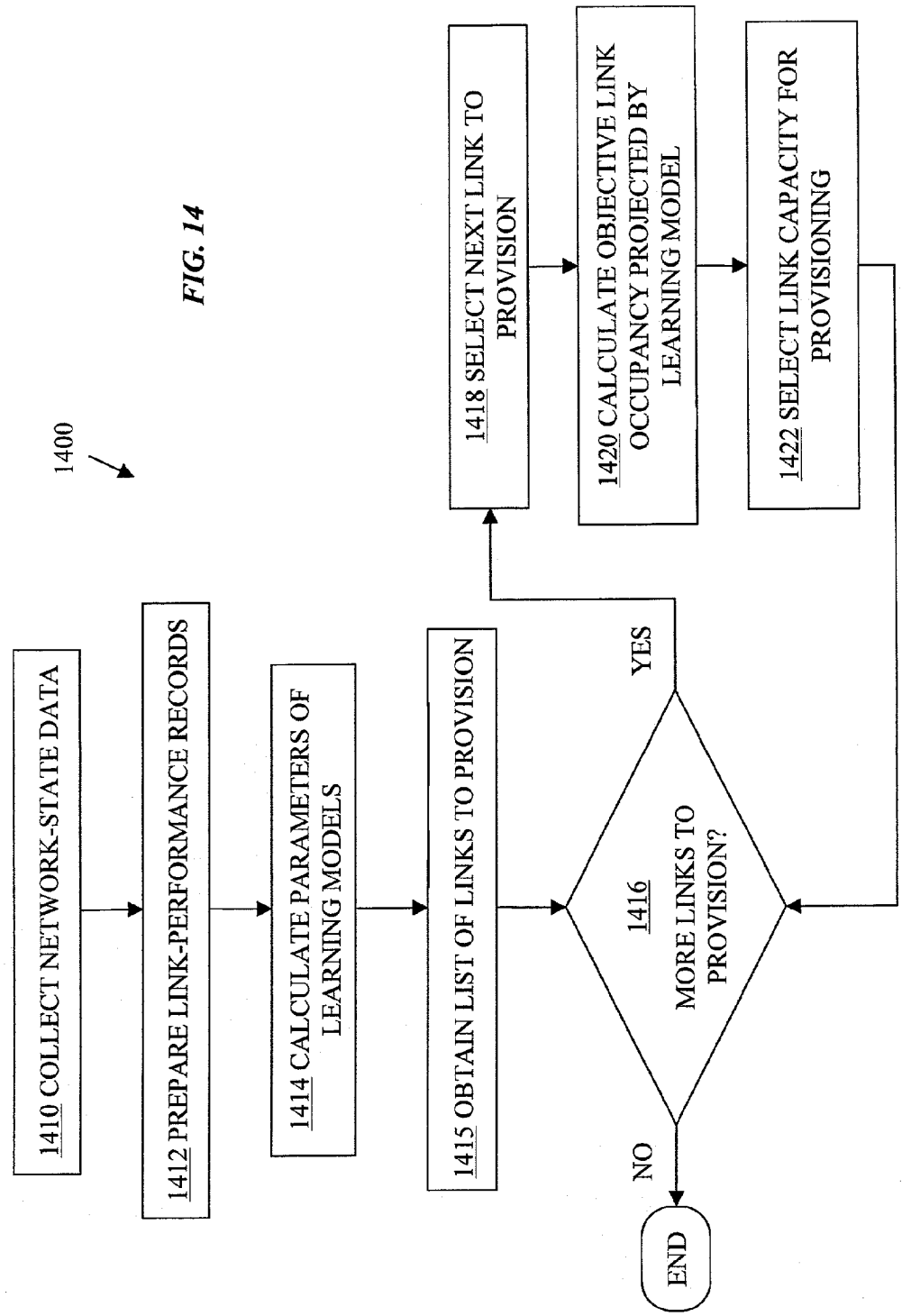
FIG. 14 is an example of a learning method for formulating provisioning recommendations in accordance with the present invention.

FIG. 14 illustrates a learning method 1400 for formulating provisioning recommendations in accordance with an embodiment of the present invention. At step 1410, network-state data may be collected. Network-state data may include traffic load measurements and/or performance measurements that may be collected at links of a network by node controllers, for example. Node controllers may send network-state data to a provisioning module at predetermined times.

At step 1412, link performance records may be prepared. The provisioning module may condition the network-state data to produce a set of link performance records (e.g., 1060). Statistical methods may be used to eliminate outlier link performance records and select a subset of records.

At step 1414, parameters of learning models may be calculated. The provisioning module may calculate parameters of a learning model of each link-type, based on link performance records associated with each link-type and selected at step 1412. Parameterization of each learning model may further involve additional calculations. For each link performance record i in a link performance table (e.g., 1000) associated with a link-type, a link occupancy $\rho_i$ may be calculated from a carried traffic $L_i$ in a traffic load (e.g., 1020) and a link capacity $c_i$ (e.g., 1014), as represented by $$\rho_i = L_i/c_i.$$

Blocking found in a performance record (e.g., 1030) of link performance record i may be represented by $b_i$. As a result, blocking vs. occupancy records ($b_i$, $\rho_i$) may be formed.

A predictor of link occupancy may be represented as a function of blocking by $$\hat{\rho} = f(b),$$

where b represents a blocking value, and may be determined through regression analysis techniques from blocking vs. occupancy records ($b_i$, $\rho_i$).

At step 1415, a list of links to provision may be obtained. Links to provision may be identified critical links. At step 1416, whether additional links to provision exist may be determined. If none are left, the process may end. Otherwise, a next link to provision may be selected at step 1418.

At step 1420, for each critical link previously identified for provisioning, a desired occupancy of a link may be calculated using a learning model, which may include a link occupancy predictor. As shown in FIG. 13, the parameters of a learning model of a link-type (e.g. 1310) may be determined from associated blocking vs. occupancy records $(b_i, \rho_i)$ (e.g. 1312). A blocking vs. occupancy record may belong to a critical link identified to require a provisioning augmentation. The identified critical link may have an index k, a carried traffic load $L_k$ and a current capacity $c_k$. A target blocking value b=B, for example 1318, may be provided as an input parameter. An objective occupancy of a critical link may be calculated as $\hat{\rho}_k = f(B)$.

At step 1422, an objective capacity $c_k'$ of a critical link may be calculated as the maximum of a current link capacity $c_k$ and a capacity estimated by a link occupancy predictor $L_k/\hat{\rho}_k$, which may be represented by $$c_k' = \max(L_k/\hat{\rho}_k, c_k),$$

where $L_k$ is a carried traffic load and $\hat{\rho}_k$ is an objective occupancy calculated at step 1420. Thus, a learning model may predict an occupancy $\hat{\rho}_k$ that may be higher than a current link occupancy $\rho_k$, thereby yielding an estimated capacity $L_k/\hat{\rho}_k$ lower than a current link capacity $c_k$. Therefore, it is desirable to implement an objective capacity $c_k'$, a maximum value of an estimated capacity $L_k/\hat{\rho}_k$ and a current capacity $c_k$ to ensure that a capacity of a critical link may be augmented or maintained, but not reduced.

At step 1422, an objective capacity for a critical link may be selected from a set of available link capacities $C=\{C_1, C_2, \ldots, C_n\}$, where n represents a number of link capacities available to provision a link. A recommended link capacity may be selected as a lowest link capacity $C_1$ in set C that is greater or equal to the objective capacity $c_k'$.

According to another embodiment of the present invention, a method for enabling a network to learn from automated measurements and to establish the relation between dependent and independent network variables is provided. Network variables may include traffic quantities, performance measures such as packet delay and connection blocking, resource utilization, failures, maintenance costs, etc. The learning method may be used to autonomously formulate recommendations on equipment selection, hardware reliability, software reliability, protocol usage, routing methods, capacity allocation, provisioning, and/or other aspects of network operations.

Many decisions made by network operators can have a significant impact on the reliability, the performance, and the cost of a network. In modern data networks, these decisions are complicated by the rapid growth of networks, the constant evolution of equipment, protocols, and applications, and the unpredictable nature of data traffic. Methods are needed to assist operators in the decision process. A method of the present invention is advantageously based on measurements collected and analyzed automatically by the network, thus minimizing, and sometimes eliminating, the need for human intervention. The system learns from historic network-state records, making few assumptions about the network behavior, and eliminating the reliance on traditional traffic models.

The learning method of an embodiment of the present invention may include the steps of (1) automatically collecting measurements in the network; (2) filtering the measurements to extract and condense relevant historic records; (3) modeling the relation between dependent and independent network-state variables using known estimation techniques, based on the collected historic records; and, (4) formulating recommendations based on the modeled relations and parameters provided by a network operator or other entities.

The learning method of an embodiment of the present invention may be adapted to make recommendations on the choice and specification of network equipment. For a given network component (e.g., a switching node), there may be several candidates based on different technologies, with different reliability, performance and maintenance cost characteristics. Such characteristics may be estimated from analytical models, but actual behavior in the field can diverge from predicted behavior. According to an aspect of the learning method of the present invention, the network may be adapted to measure component failures, maintenance operations and/or real-time performance (including for example packet delay, connection blocking, etc.). The measurements may be stored in databases and used by a learning algorithm to formulate recommendations on equipment selection. The learning method may identify, for example, a certain component (or components) that achieve improved performance.

Various software components may also have different reliability, performance and/or cost characteristics. Similarly to hardware components, these characteristics may be measured and analyzed by the learning method of the present invention to determine a relation between software reliability, performance and/or cost. The learning method of the present invention may recommend, for example, a certain software component based on reliability, software complexity and/or other factors.

Another factor adding to the complexity of network operation may involve the simultaneous presence of a growing number of protocols in the network. The learning method of the present invention may be used to evaluate protocols. For example, the method may record protocol errors, recovery times, signaling delays, resource utilization, and/or other network-performance measures related to protocol operations. The method may analyze the recorded data and may recommend, for example, new protocol parameters that would improve network efficiency.

Generally, routing methods have a significant impact on network resource utilization and network performance. In another aspect of the learning method of the present invention, the impact of routing decisions on blocking, delay, capacity allocation and/or other network-state variables may be measured by the network. The learning method of the present invention may analyze the measurements to specify, for example, new route sets that would improve network efficiency.

The learning method of the present invention may be adapted to make recommendations on capacity allocations, for example. Capacity allocations may include, for example, the configuration of wavelength-channels in an automatically switched optical network. The learning method of the present invention may relate capacity allocations to measurements of traffic volumes and the resulting network reliability, performance, and/or operation costs. Based on the analysis of collected data, the method of the present invention may recommend, for example, constraining capacity allocations to avoid unfavorable configurations.

A learning method of the present invention for formulating provisioning recommendations is provided. In accordance with the method, the network is adapted to maintain network-state records from collected network performance measurements and traffic measurements. The method of the present invention relates network performance, traffic measurements and link capacities from the stored network-state records to identify critical links and calculate their desired capacity.

In a method of source routing according to an embodiment of the present invention, a controller at each edge node maintains a route set to each other edge node. A route set may comprise at least one route. When a route set comprises only one route, the route is classified as a primary route. When a route set comprises two or more routes, each of the routes may be classified as a primary route or a secondary route, as described above.

In a hop-by-hop routing method according to an embodiment of the present invention, a controller at each node, whether the node is an edge node 210 or a core node 220, associates a link set, comprising at least one link, with each destination edge node. At a given node, each link in a link set would normally be defined by an output port of the node. Any link in a link set may be used to direct a traffic request to a subsequent node which may be a destination node or another node to be used as an intermediate node along a path to a specified destination edge node. The links in a link set may be categorized into primary links and secondary links, for example. If a link set includes only one link, then the link is a primary link. When a link set includes two or more links, a merit of each link is determined according to the shortest path that can be realized by using the link. Criteria other than a path length may be considered. The link having the most favorable merit is categorized as a primary link. Within a link set, more than one link may be categorized as primary. A primary route from a source edge node to a sink edge node is a route that traverses only primary links.

When a node along a route to a destination edge node selects a secondary link for a traffic request, the resulting route is treated as a secondary route. The first node that selects a secondary link due to insufficient free capacity in any of the primary links in a link set associated with the destination edge node marks the traffic request as a secondary traffic request which is treated in a way similar to that of a secondary request in the source-routing method described above.

At this point it should be noted that providing autonomous network provisioning in accordance with the present invention as described above typically involves the processing of input data and the generation of output data to some extent. This input data processing and output data generation may be implemented in hardware or software. For example, specific electronic components may be employed in a node or similar or related circuitry for implementing the functions associated with providing autonomous network provisioning in accordance with the present invention as described above. Alternatively, one or more processors operating in accordance with stored instructions may implement the functions associated providing autonomous network provisioning in accordance with the present invention as described above. If such is the case, it is within the scope of the present invention that such instructions may be stored on one or more processor readable media, or transmitted to one or more processors via one or more signals.

Embodiments of any of the aspects of the present invention may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product). For example, in a method according to an embodiment of the present invention, various steps may be performed at each of an edge controller, core controller, or network controller. These steps may be implemented via software that resides on a computer readable memory located at each of said edge controller, core controller, or network controller.

The embodiments of the present invention can be further extended to relate to other areas of communication networks. Specifically the embodiments of the present invention can be applied to the field of a Network Management application. Similarly the embodiments of the present invention can be extended to the area of traditional hop-by-hop routing networks.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for autonomous provisioning of a network comprising a plurality of nodes, the method comprising the steps of:

receiving at least one network-state measurement comprising at least one of a traffic measurement and a performance measurement, wherein the traffic measurement comprises constituent traffic, wherein the constituent traffic comprises a combination of a primary traffic, a secondary traffic, and a denied traffic;

determining at least one critical link based at least in part on the at least one network-state measurement, wherein the step of determining at least one critical link further comprises the steps of:

marking a traffic request according to a status of a selected route;

classifying at least one link according to at least one measurement of the marked traffic request; and identifying at least one primary link having a ratio of primary traffic over secondary traffic above a predetermined threshold; and formulating at least one link provisioning recommendation for the at least one critical link.

2. The method of claim 1, wherein the performance measurement comprises at least one of a routing index and a resource allocation index, the routing index measuring efficacy of a routing function and the resource allocation index measuring efficacy of a resource allocation function.

3. The method of claim 1, wherein the step of determining further comprises the step of:
    determining whether denied traffic is above a predetermined denied traffic threshold.

4. The method of claim 1, wherein the step of formulating further comprises the step of:
    identifying the at least one critical link for capacity augmentation.

5. The method of claim 1, wherein the step of formulating further comprises the step of:
    calculating a capacity for the at least one critical link.

6. The method of claim 1, wherein the step of formulating further comprises the step of:
    implementing a learning method based on at least one historic network-state record.

7. The method of claim 6, wherein the learning method determines inter-dependence among a combination of network performance, at least one traffic measurement and at least one resource capacity from a plurality of historic network-state records.

8. The method of claim 7, wherein network performance comprises a quantification of at least one denied traffic request.

9. The method of claim 7, wherein the at least one traffic measurement comprises constituent traffic, wherein constituent traffic comprises a combination of a primary traffic, a secondary traffic and a denied traffic.

10. The method of claim 7, wherein the at least one resource capacity comprises at least one link capacity.

11. The method of claim 7, wherein the learning method uses regression analysis based on at least two blocking vs. occupancy records for a link-type wherein the link-type is based on at least a link capacity and a blocking vs. occupancy record comprising a link performance measurement and a link capacity measurement.

12. The method of claim 7, further comprising the step of:
    determining an objective link occupancy yielding a projected blocking probability equal to or less than a blocking-probability target.

13. The method of claim 1, further comprising the step of:
    distributing a provisioning resource budget to the at least one critical link according to the at least one link provisioning recommendation.

14. The method of claim 2, wherein the routing function is a source routing function and the step of determining further comprises the step of marking a traffic request according to a status of a selected route from a route set containing at least one route.

15. The method of claim 2, wherein the routing function is a hop-by-hop routing function and the step of determining further comprises the step of marking a traffic request according to a status of a selected link from a link set containing at least one link.

16. At least one processor readable storage medium for storing a computer program of instructions configured to be readable by at least one processor for instructing the at least one processor to execute a computer process for performing the method as recited in claim 1.

17. A system for autonomously provisioning a network, the system comprising:
    a network controller for receiving at least one network-state measurement comprising at least one of a traffic measurement and a performance measurement, wherein the traffic measurement comprises constituent traffic, wherein the constituent traffic comprises a combination of primary traffic, secondary traffic, and denied traffic;
    a determining module for determining at least one critical link based at least in part on the at least one network-state measurement, wherein the determining module further marks a traffic request according to a status of a selected route; classifies at least one link according to at least one measurement of the marked traffic request; and identifies at least one primary link having a ratio of primary traffic over secondary traffic above a predetermined threshold; and
    a provisioning module for formulating at least one link provisioning recommendation for the at least one critical link.

18. The system of claim 17, wherein the performance measurement comprises at least one of a routing index and a resource allocation index, the routing index measuring efficacy of a routing function and the resource allocation index measuring efficacy of a resource allocation function.

19. The system of claim 17, wherein the determining module further determines whether denied traffic is above a predetermined denied traffic threshold.

20. The system of claim 17, wherein the provisioning module further identifies the at least one critical link for augmentation.

21. The system of claim 17, wherein the provisioning module further calculates a capacity for the at least one critical link.

22. The system of claim 21, further comprising a budget module for apportioning a provisioning resource budget among the at least one critical link according to the at least one link provisioning recommendation.

23. The system of claim 17, wherein a learning method based on at least one historic network-state record is implemented in formulating the at least one link provisioning recommendation.

24. The system of claim 23 wherein the learning method determines inter-dependence among a combination of network performance, at least one traffic measurement and at least one resource capacity from a plurality of historic network-state records.

25. The system of claim 24, wherein network performance comprises a quantification of at least one denied traffic request.

26. The system of claim 24, wherein the at least one traffic measurement comprises constituent traffic, wherein constituent traffic comprises a combination of a primary traffic, a secondary traffic and a denied traffic.

27. The system of claim 24, wherein the at least one resource capacity comprises at least one link capacity.

28. The system of claim 24, wherein the learning method uses regression analysis based on at least two blocking vs. occupancy records for a link-type wherein the link-type is based on at least a link capacity and a blocking vs. occupancy record comprising a link performance measurement and a link capacity measurement.

29. The system of claim 24, wherein an objective link occupancy is determined to yield a projected blocking probability equal to or less than a blocking-probability target.

30. An article of manufacture for autonomously provisioning a network, the article of manufacture comprising:
    at least one computer readable medium; and
    instructions carried on the at least one computer readable medium;

wherein the instructions are configured to be readable from the at least one computer readable medium by at least one processor and thereby cause the at least one processor to operate so as to:

receive at least one network-state measurement comprising at least one of a traffic measurement and a performance measurement, wherein the traffic measurement comprises constituent traffic, wherein the constituent traffic comprises a combination of a primary traffic, a secondary traffic, and a denied traffic;

determine at least one critical link based at least in part on the at least one network-state measurement, wherein the step of determining at least one critical link further comprises the steps of:

marking a traffic request according to a status of a selected route;

classifying at least one link according to at least one measurement of the marked traffic request; and identifying at least one primary link having a ratio of primary traffic over secondary traffic above a predetermined threshold; and formulate at least one link provisioning recommendation for the at least one critical link.

31. The article of manufacturing of claim 30, further causing the at least one processor to operate so as to:

identify the at least one critical link for augmentation; and
calculate a desired capacity for the at least one critical link.

32. A method for autonomous provisioning of a network, the method comprising the steps of:

receiving at least one network-state measurement comprising at least one of a traffic measurement and a performance measurement, wherein the traffic measurement comprises constituent traffic, wherein the constituent traffic comprises a combination of a primary traffic, a secondary traffic, and a denied traffic;

determining at least one critical link based at least in part on the at least one network-state measurement, wherein the step of determining at least on critical link further comprises the step of:

marking at least one traffic request according to a status of a selected route;

classifying at least one resource according to measurements of the at least one marked traffic request;

sending at least one measurement request to a node which follows a blocking node in a sequence of nodes selected for a traffic request; and formulating at least one provisioning recommendation by learning from at least one historic network-state record.

33. The method of claim 32 wherein the network employs at least two protocols and the learning is based on regression analysis related to the at least two protocols.

* * * * *